United States Patent
Perl et al.

(10) Patent No.: US 9,286,381 B2
(45) Date of Patent: Mar. 15, 2016

(54) DISJOINT PARTIAL-AREA BASED TAXONOMY ABSTRACTION NETWORK

(75) Inventors: Yehoshua Perl, Forest Hills, NY (US); James Geller, West Orange, NJ (US); Michael Howard Halper, Fair Lawn, NJ (US); Joyce Wang, Bothell, WA (US)

(73) Assignees: NEW JERSEY INSTITUTE OF TECHNOLOGY, Newark, NJ (US); KEAN UNIVERSITY, Union, NJ (US)

( * ) Notice: Subject to any disclaimer, the term of this patent is extended or adjusted under 35 U.S.C. 154(b) by 475 days.

(21) Appl. No.: 13/565,097

(22) Filed: Aug. 2, 2012

(65) Prior Publication Data

US 2013/0060776 A1   Mar. 7, 2013

Related U.S. Application Data

(60) Provisional application No. 61/514,169, filed on Aug. 2, 2011.

(51) Int. Cl.
G06F 7/00 (2006.01)
G06F 17/30 (2006.01)

(52) U.S. Cl.
CPC .... *G06F 17/30734* (2013.01); *G06F 17/30572* (2013.01)

(58) Field of Classification Search
None
See application file for complete search history.

(56) References Cited

PUBLICATIONS

Wang et al, 'Structural methodologies for auditing SNOMED', Journal of Biomedical Informatics, 2006, pp. 561-581.*
Wang et al, 'Auditing Complex Concepts in Overlapping subsets of SNOMED', AMIA 2008 Symposium Proceedings, pp. 273-277.*
Holi et al, 'Modeling Degrees of Conceptual Overlap in Semantic Web Ontologies', 2005, pp. 1-10.*
'IHTSDO: SNOMED CT (Systematized Nomenclature of Medicine—Clinical Terms)' website, http://www.ihtsdo.org/snomed-ct, Accessed at Sep. 23, 2015, pp. 1-2.*
Y. Wang, M. Halper, H. Min, Y. Perl, Y. Chen, K. A. Spackman, Structural methodologies for auditing SNOMED, Journal of Biomedical Informatics 40 (5) (2007) 561-581.
M. Halper, Y. Wang, H. Min, Y. Chen, G. Hripcsak, Y. Perl, K. A. Spackman, Analysis of error concentrations in SNOMED, in: J. M. Teich, J. Suermondt, G. Hripcsak (Eds.), Proc. 2007 AMIA Annual Symposium, Chicago, IL, 2007, pp. 314-318.
Y. Wang, M. Halper, D. Wei, H. Gu, Y. Perl, J. Xu, G. Elhanan, Y. Chen, K. A. Spackman, J. T. Case, G. Hripcsak, Auditing complex concepts of SNOMED using a refined hierarchical abstraction network; J Biomed Inform. Feb. 2012; 45(1): 1-14.
Y. Wang, D. Wei, J. Xu, G. Elhanan, Y. Perl, M. Halper, Y. Chen, K. A. Spackman, G. Hripcsak, Auditing complex concepts in overlapping subsets of SNOMED, in: J. Suermondt, R. 45 S. Evans, L. Ohno-Machado (Eds.), Proc. 2008 AMIA Annual Symposium, Washington, DC, 2008, pp. 273-277.
D. Wei, M. Halper, G. Elhanan, Y. Chen, Y. Perl, J. Geller, K. A. Spackman, Auditing SNOMED relationships using a converse abstraction network, in: Proc. 2009 AMIA Annual Symposium, San Francisco, CA, 2009, pp. 685-689.

(Continued)

*Primary Examiner* — Scott A Waldron
*Assistant Examiner* — Cheryl M Shechtman
(74) *Attorney, Agent, or Firm* — Timothy X. Gibson, Esq.; Gibson & Dernier LLP

(57) ABSTRACT

A disjoint partial-area taxonomy abstraction network and methods of producing same for a hierarchy, which partitions overlapping concepts into singly-rooted disjoint groups that are more manageable to work with and comprehend. This provides abstract models for summarizing overlapping concepts which permit enhanced, high-level display for users at a user interface.

15 Claims, 20 Drawing Sheets

(56) References Cited

PUBLICATIONS

D. Wei, Y. Wang, Y. Perl, J. Xu, M. Halper, K. A. Spackman, Complexity measures to track the evolution of a SNOMED hierarchy, in: J. Suermondt, R. S. Evans, L. Ohno-Machado (Eds.), Proc. 2008 AMIA Annual Symposium, Washington, DC, 2008, pp. 778-782.

H. Min, Y. Perl, Y. Chen, M. Halper, J. Geller, Y. Wang, Auditing as part of the terminology design life cycle, JAMIA 13 (6) (2006) 676-690.

Y. Chen, H. Gu, Y. Perl, J. Geller, M. Halper, Structural group auditing of a UMLS semantic type's extent, Journal of Biomedical Informatics 42 (1) (2009) 41-52.

Y. Chen, H. Gu, Y. Perl, J. Geller, Structural group-based auditing of missing hierarchical relationships in UMLS, Journal of Biomedical Informatics 42 (3) (2009) 452-467.

J. Geller, C. P. Morrey, J. Xu, M. Halper, G. Elhanan, Y. Perl, G. Hripcsak, Comparing inconsistent relationship configurations indicating UMLS errors, in: Proc. 2009 AMIA Annual Symposium, San Francisco, CA, 2009, pp. 193-197.

J. J. Cimino, H. Min, Y. Perl, Consistency across the hierarchies of the UMLS Semantic Network and Metathesaurus, Journal of Biomedical Informatics 36 (6) (2003) 450-461.

J. Geller, H. Gu, Y. Perl, M. Halper, Semantic refinement and error correction in large terminological knowledge bases, Data & Knowledge Engineering 45 (1) (2003) 1-32.

H. Gu, Y. Perl, G. Elhanan, H. Min, L. Zhang, Y. Peng, Auditing concept categorizations in the UMLS, Artificial Intelligence in Medicine 31 (1) (2004) 29-44.

H. Gu, G. Hripcsak, Y. Chen, C. P. Morrey, G. Elhanan, J. J. Cimino, J. Geller, Y. Perl, Evaluation of a UMLS auditing process of semantic type assignments, in: J. M. Teich, J. Suermondt, G. Hripcsak (Eds.), Proc. 2007 AMIA Annual Symposium, Chicago, IL, 2007, pp. 294-298.

Y. Chen, H. Gu, Y. Perl, M. Halper, J. Xu, Expanding the extent of a UMLS semantic type via group neighborhood auditing, JAMIA 16 (5) (2009) 746-757.

M. J. Lincoln, S. H. Brown, V. Nguyen, T. Cromwell, et al., U.S. Department of Veterans Affairs Enterprise Reference Terminology strategic overview, in: M. Fieschi, et al. (Eds.), Proc. Medinfo2004, San Francisco, CA, 2004, pp. 391-395.

Department of Health and Human Services, Health Information Technology: Initial Set of Standards, Implementation Specifications, and Certification Criteria for Electronic Health Record Technology; Final Rule, 45 CFR Part 170, Jul. 28, 2010.

\* cited by examiner

DISJOINT PARTIAL-AREA BASED TAXONOMY ABSTRACTION NETWORK

CROSS-REFERENCE TO RELATED APPLICATIONS

This application claims the benefit of U.S. Provisional Patent Application Ser. No. 61/514,169 filed Aug. 2, 2011, the entirety of which is incorporated by reference herein.

STATEMENT REGARDING FEDERALLY SPONSORED RESEARCH

This invention was made with government support under grants (NLM 1R01LM008912) awarded by the National Library of Health of the National Institute of Health The government has certain rights in the invention.

FIELD OF THE INVENTION

The present invention relates to the fields of abstraction networks and taxonomy, and specifically, an abstraction network, system and methods for deriving same for large, complex ontologies.

BACKGROUND OF THE INVENTION

Terminologies, ontologies, and vocabularies are valuable tools for conceptualizing complex relationships in certain application fields such as medical terminologies and organizational charts of large enterprises. These knowledge bases consist of a collection of concepts describing entities in the application field, attributes describing them, and relationships directed between concepts. Concepts are connected by hierarchical ("IS-A") relationships, wherein an IS-A relationship from one concept to another concept indicates that the former is more specific than the latter. The power of terminologies comes out of their visual display, which is much easier to mentally process than a textual representation. However, for large terminologies—practically all useful terminologies are large—the visual display also becomes difficult to comprehend. To deal with this problem, it is possible to derive abstraction networks from large terminologies, which maintain the gestalt of a larger terminology. Such a network should be displayable as a compact diagram in its own right.

In previous work, the present inventors have carried out structural analyses of hierarchies yielding two types of high-level abstraction networks: area taxonomy and partial-area taxonomy. See, Y. Wang, et al, Structural methodologies for auditing SNOMED, Journal of Biomedical Informatics 40 (5) (2007) 561-581, incorporated herein by reference in its entirety. Each serves to capture the relationship distribution within a hierarchy from a high-level perspective. Both networks are derived based on the respective relationships exhibited by the concepts in the hierarchy. The latter network refines the former by including additional hierarchical grouping knowledge.

However, the foregoing are not adequate to partition and generate a diagram that correctly separates partial areas and overlapping sets from each other to allow the generation of a user-friendly diagram without overlaps.

SUMMARY OF THE INVENTION

In accordance with one aspect of the present invention, methods are provided which overcome some deficiencies in dealing with particularly complex portions of an ontology. Complex concepts—characterized by various structural features—are often obstacles to orientation and comprehension efforts and usually are natural places to look for modeling errors. Concepts, in at least one sense, are complex when they simultaneously belong to multiple groups along some given categorizing dimension.

For example, SNOMED CT (Systematized Nomenclature of Medicine—Clinical Terms) is a description-logic-based (DL-based) medical terminology covering a wide range of clinical concepts, including diseases, clinical findings, procedures, specimens, substances, etc. IHTSDO: SNOMED CT. SNOMED CT has proven to be an important resource to the healthcare and biomedical community since its origination in 2002. However, its expanding size (291,000 concepts designated as "current" in the Jan. 2010 release) and inherent complexity may hinder its usability and further deployment. Advanced tools for the display of aspects of SNOMED's conceptual content, facilitating orientation and comprehension, are needed. In the context of SNOMED auditing, concepts appearing in regions of the partial-area taxonomy characterized by the convergence of multiple ancestral inheritance paths were deemed to be complex and given auditing priority. M. Halper, et al., Analysis of error concentrations in SNOMED, in: J. M. Teich, et al. (Eds.), Proc. 2007 AMIA Annual Symposium, Chicago, Ill., 2007, pp. 314-318.

In accordance with one aspect of the present invention, we focus on another variety of complex concepts, where a structural feature is being used to determine "complex." Here, the structural feature is set overlap, and the concepts are those that reside in overlapping portions of two or more sub-area groupings called partial-areas. Such a concept, called an "overlapping concept," is considered complex because it is simultaneously modeled as the specialization of multiple ancestors defining different partial-areas. The multiple partial-area memberships imply that the concept elaborates a multi-faceted semantics. The entire collection of these overlapping concepts may constitute a highly tangled subhierarchy.

It is one object of the present invention to provide a method which summarizes and diagrammatically displays an overwhelming ontology that fits on one single (or a handful of) computer screens such that the elements that are visible still contain readable text labels. Preferably, the elements shown on the screen are the most important elements that describe what is essential to the domain.

In one aspect of the present invention a method is provided to impose some order on such a subhierarchy to facilitate orientation and comprehension for various users. In particular, one aspect of the present invention relates to an automated methodology for partitioning the entire set of overlapping concepts. Said overlapping belongs to separate, newly defined grouping structures. From these, one aspect of the present invention allows for the derivation of a refined partial-area taxonomy, called a disjoint partial-area taxonomy, that captures the prevailing hierarchical configuration of the overlaps. A user is presented with a view showing the gestalt of the overlaps, allowing for easier comprehension of their content.

In accordance with one embodiment, an abstraction network, referred to herein as a disjoint partial area taxonomy and methods for deriving this abstraction network for a large, complex ontology are disclosed. In one aspect a method for deriving a a disjoint partial area taxonomy essentially includes deriving an area taxonomy from a given hierarchy including finding sets of concepts that have identical relationships and replacing each such set of concepts with one single "area", and representing in a diagram every area as a node (a graphical image, such as a box, etc. representing a concept)

connected to other nodes by links (such as arrows, etc. representing semantic relationships) so that an area is a set of concepts with exactly the same outgoing semantic relationships. A concept of an area that has hierarchical ("IS-A") relationships only to concepts outside of the area is called a "root" of that area. The method may further include connecting areas such that all IS-A relationships from a root concept of the area to a concept in another, second area results in a child-of hierarchical link to that second area in the area taxonomy. Thus, areas and child-of links together form the area taxonomy, an abstraction network which is typically much smaller than the ontology it is abstracting.

Within each area there is at least one root concept, but many areas have several root concepts. The children and other descendants of a root concept are all similar in meaning ("semantics").

In accordance with a further aspect, the method includes dividing all the concepts in each area such that all the descendant concepts of one root form a partial-area. This can be termed a partial area taxonomy, and is a refinement of the area taxonomy which represents each partial area as a smaller graphical representation (such as a box) within each graphical representation of an area (such as a larger box). Thus, the diagram of a partial-area taxonomy is more refined and complex than the diagram of an area taxonomy, but still simpler than the original ontology.

However, since partial areas are not necessarily disjoint, because some concepts may be descendants of more than one root, in accordance with a still further aspect, the method includes partitioning and generating a diagram that correctly separates partial-areas and overlapping sets from each other resulting in a user-friendly diagram without overlaps.

The designation complex is arrived at automatically on the basis of structural analysis of set overlap among the constituent concept groups of the partial-area taxonomy. Such complex concepts, called overlapping concepts, constitute a tangled portion of a hierarchy and can be obstacles to users trying to gain an understanding of the terminology's content. The method partitions the entire collection of overlapping concepts into singly-rooted groups that are more manageable to work with and comprehend.

In further aspects, the invention includes apparatus including a processor operating to perform actions in response to executing computer program instructions, the actions including the steps described above for providing a disjoint partial-area taxonomy. In one aspect a system is provided which can generate and display a partial-area taxonomy which represents an overwhelming ontology, that fits on one single (or a handful of) computer screens such that the elements that are visible still contain readable text labels.

An apparatus is provided in one embodiment including a processor operating to perform actions in response to executing computer program instructions, the actions including deriving an area taxonomy from a given hierarchy, comprising identifying sets of concepts in the hierarchy that have identical relationships, replacing each set of the concepts with a single area, representing every area as a node connected to other nodes by links representing semantic relationships, identifying root concepts, and connecting areas so that all IS-A relationships from the root concept of the area to a concept in another area results in a child-of hierarchical link to the second area, dividing all concepts in each area such that all descendant concepts of a single root form a partial area, and representing each partial-area as a smaller item within each representation of an area. Further partitioning partial areas and generating a diagram separating partial areas into base partial areas without overlap and overlapping sets. The apparatus may be operable to displaying the diagram on a user interface such as a computer screen. In one embodiment the apparatus operates such that the single root provides a uniform semantics for the partial area. The representation of a partial-area on a user interface may be a shape within a larger shape, such as a box within a box. The diagram is preferably dimensioned to fit on a single computer screen such that the text is readable.

The invention includes in yet a further aspect a non-transitory, computer readable storage medium containing a computer program, which when executed by a computer processor causes the computer processor to perform actions, the actions including the steps described above for providing a disjoint partial-area taxonomy.

In accordance with one embodiment, a non-transitory, computer readable storage medium is disclosed containing a computer program, which when executed by a computer processor causes the computer processor to perform actions, the actions including deriving an area taxonomy from a given hierarchy, comprising identifying sets of concepts in the hierarchy that have identical relationships, replacing each set of the concepts with a single area, representing every area as a node connected to other nodes by links representing child-of hierarchical relationships, reflecting hierarchical (IS-A) relationships by identifying root concepts of an area, and connecting areas so that all IS-A relationships from the root concept of the area to a concept in another area results in a child-of hierarchical link to the second area. The actions include dividing all concepts in each area, such that all descendant concepts of a single root form a partial-area, representing each partial-area as a smaller item within each representation of an area, and partitioning and generating a diagram separating partial-areas into base partial-areas without overlaps and disjoint partial-areas containing overlapping concepts. The computer-readable storage medium may be operable to display the diagram on a user interface such as a computer terminal screen, monitor or the like. In one embodiment the computer-readable storage medium is operable such that the single root provides a uniform semantics for the partial-area. The representation of a partial-area on a user interface may be a shape within a larger shape, such as a box within a box. The diagram is preferably dimensioned to fit on a single computer screen and the text is readable.

One class of user, in particular, that can benefit from the refined, high-level display offered by the new abstraction network is the domain-expert auditor. In fact, the network serves as the basis for an enhanced auditing regimen that is applied to the overlapping concepts and enables the discovery of troublesome aspects.

BRIEF DESCRIPTION OF THE DRAWINGS

The patent or application file contains at least one drawing executed in color. Copies of this patent or patent application publication with color drawings will be provided by the Patent and Trademark Office upon request and payment of the necessary fee.

For the purposes of illustration, there are forms shown in the drawings that are presently preferred, it being understood, however, that the invention is not limited to the precise arrangements and instrumentalities shown.

FIG. 13 is a block diagram of d-partial-area taxonomy excerpt corresponding to FIG. 12 according to one or more aspects of the present invention;

FIG. 14 is a block diagram of a node for the area {substance} in a 2007 SNOMED release in d-partial-area taxonomy according to one or more aspects of the present invention.

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Figure 1:
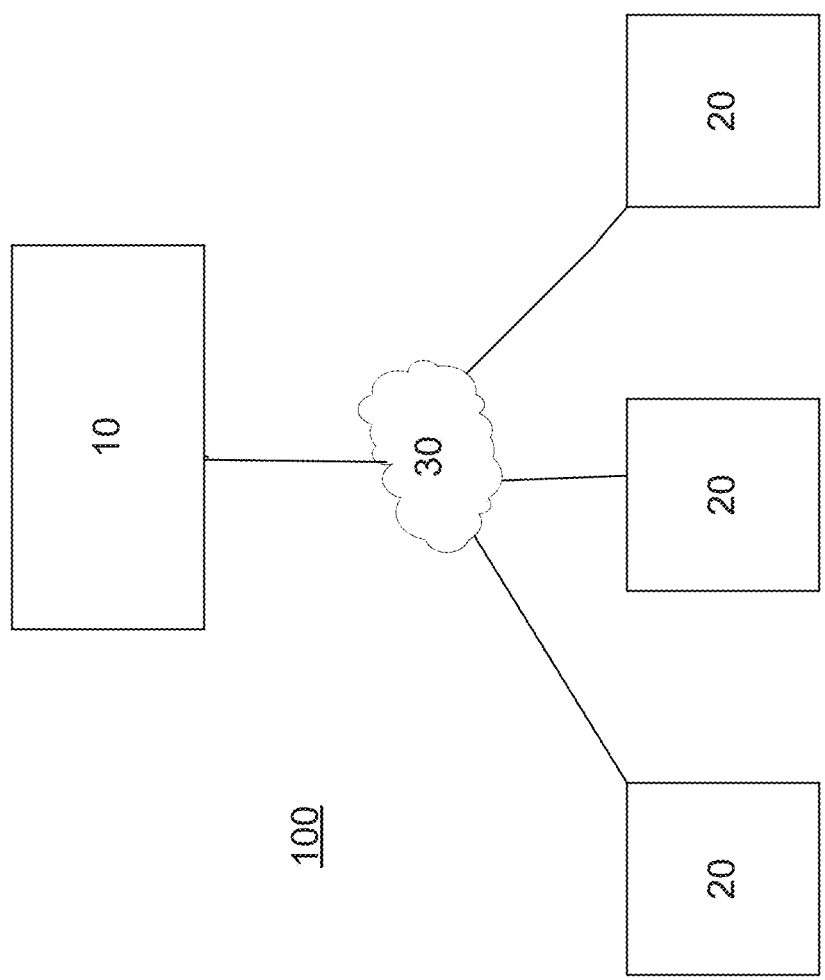
FIG. 1 is a block diagram of a network system suitable for carrying out methods in accordance with one or more embodiments of the present invention.

With reference to the drawings, wherein like numerals indicate like elements, there is shown in FIG. 1 a block diagram illustrating an example of a system 100 for providing a disjoint partial-area taxonomy.

The system 100 preferably includes at least one server 10 coupled to one or more user computers 20 over a network 30, such as the Internet. The server 10 and user computers are operable to carry out computing activity (e.g., the execution of suitable software code) in connection with implementing the functions and actions of the system 100 disclosed and described herein.

By way of example, the server 10 and/or the user computers 20 may be implemented using known hardware, firmware, and/or software, as well as specialized software for carrying out specific functions and actions desirable for implementing embodiments of the invention. For example, with reference to FIG. 2, the server 10 and/or the user computers 20 may include a computer 101, which includes a data processing unit (or processor) 102 and a memory 104 operatively coupled by way of a data and/or instruction bus 106. The processor 102 may be implemented utilizing any of the known hardware, such as a digital microprocessor, a computer (such as a portable, a stationary and/or a distributed computing system), or any of the other known and/or hereinafter developed data processing units. The memory 104 may be implemented by way of separate hardware or may be disposed within the data processing unit 102, and any of the known hardware and/or software for implementing the memory function may be employed.

Data are preferably input to, and output from, the data processing unit 102 by way of an input/output device (or I/O interface) 108. Operators of the system 100 may desire to input software programs and/or data into the computer 101 by way of an external memory 110 that is coupled to the I/O interface 108 by way of a suitable link (such as a cable, wireless link, etc.) The external memory 110 may be implemented via a flash-drive, disc, remotely located memory device, etc.

The server 10 and/or the user computers 20 may also include an interface device 111, which is operatively coupled to the I/O interface 108 of the computer 101 via a suitable link, such as a cable, wireless link, etc. The interface device 111 includes at least one display 112, as well as an input device 114, such as a keyboard, mouse, voice recognition system, etc. The operators of the system 100, such as an IT professional (on the server 10 end) or a researcher (on the user computer 20 end), preferably utilizes the interface device 111 to provide information to the computer 101 in connection with entering appropriate data and/or programs into the system 100.

The computer 101 manipulates data via suitable software code in accordance with various embodiments of the invention and may display results on the display 112 for consideration by the various operators (IT professionals, users, etc.). In accordance with well-known techniques, the results may also be stored within the memory 104 of the computer 101, output and saved on the external memory device 110, and/or provided in any of a number of other ways.

Figure 2:
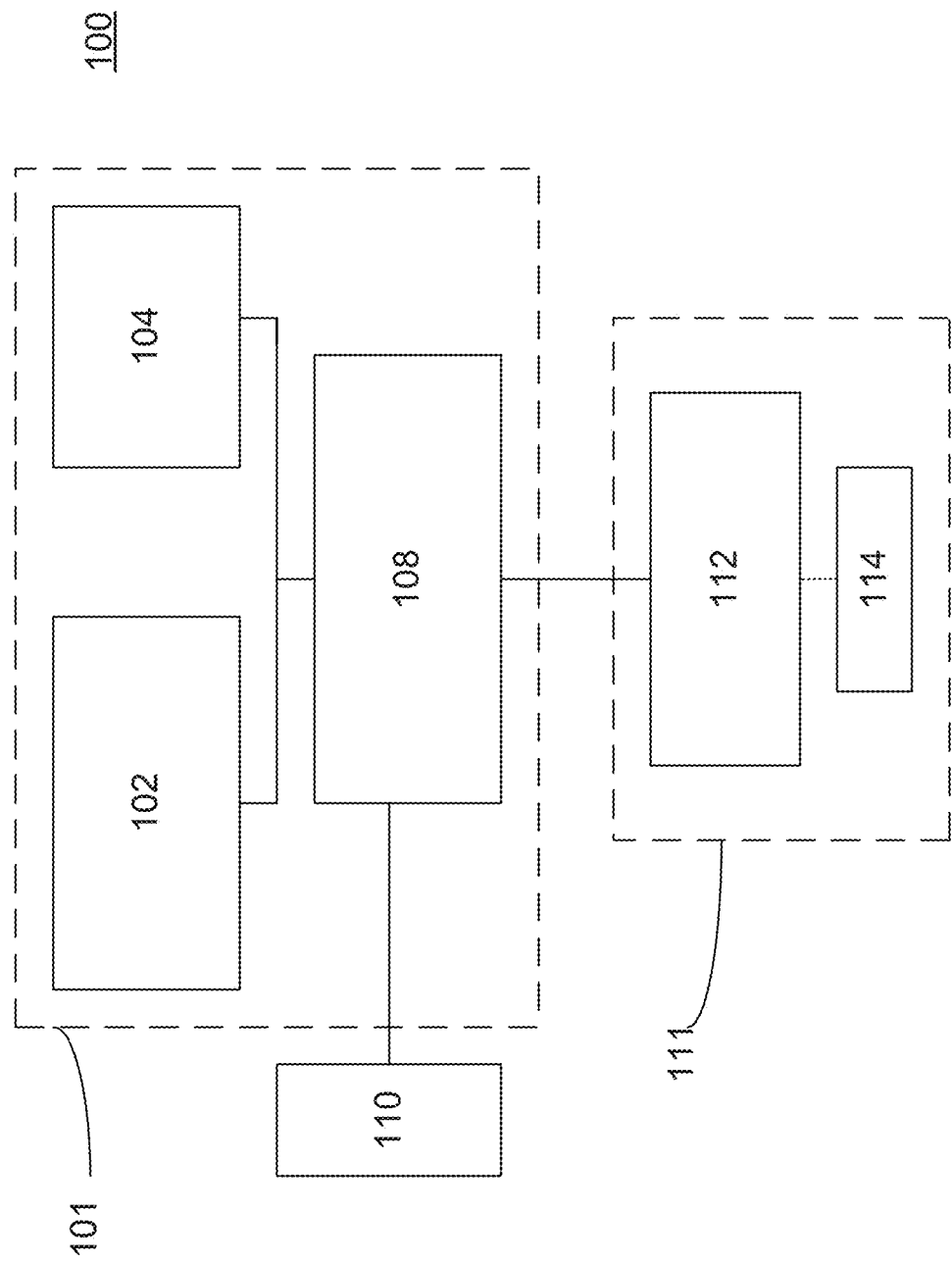
FIG. 2 is a block diagram of a computing system suitable for carrying out methods in accordance with one or more embodiments of the present invention.

It is noted that the functional blocks illustrated in FIGS. 1-2 may be partitioned as shown or may be partitioned in any other way, such as in an integral fashion. By way of example, the system 100 may be implemented utilizing a portable, stationary, or distributed computer operating under one or more suitable computer programs. Further, one or more of the functional blocks of the system 100 may be remotely located from the others, such as in a distributed (e.g., networked) system.

Irrespective of how the system 100 is implemented and/or partitioned, it preferably carries out one or more methods for providing a disjoint partial-area taxonomy.

To place the present invention in context and to better illustrate its applicability, it is useful to discuss area taxonomy in general and applications thereof with respect to SNOMED. SNOMED CT (Systematized Nomenclature of Medicine—

Clinical Terms), formed through the merger of SNOMED RT (Reference Terminology) and the UK's CTV3 (Clinical Terms Version 3), is a description-logic-based (DL-based) medical terminology covering a wide range of clinical concepts, including diseases, clinical findings, procedures, specimens, substances, etc. IHTSDO: SNOMED CT. SNOMED CT has proven to be an important resource to the healthcare and biomedical community since its origination in 2002. However, its expanding size (291,000 concepts designated as "current" in the Jan. 2010 release) and inherent complexity may hinder its usability and further deployment. Advanced tools for the display of aspects of SNOMED's conceptual content, facilitating orientation and comprehension, are needed.

In previous work, we have devised high-level abstraction networks based on analyses of a SNOMED hierarchy's attribute relationships and their patterns of inheritance. Y. Wang, et al., Structural methodologies for auditing SNOMED, Journal of Biomedical Informatics 40 (5) (2007) 561-581. A hierarchy's concepts were partitioned into groups, called areas, according to their specific attribute relationships. From this partition, an abstraction network, referred to as the area taxonomy, affording a summary view of the distribution of the attribute relationships was constructed. Further refinement of areas led to another abstraction network, the partial-area taxonomy, which conveyed information about sub-area hierarchical arrangements. In addition to their support for orientation to and comprehension of a SNOMED hierarchy, the two networks have served as the bases of our formulation of structural methodologies for auditing SNOMED hierarchies. Importantly, we found that many concept errors manifested themselves as structural anomalies at the taxonomy level, and thus the taxonomies proved to be effective building blocks for automated auditing regimens.

Each SNOMED concept has a unique descriptive term, called its "fully specified name" (FSN), a preferred term, and, typically, a set of synonyms. Concepts are organized in nineteen (19) top-level, singly-rooted hierarchies to capture broad, clinically-related groupings, such as Clinical Finding, Substance, Body Structure, and so on. Concepts within one hierarchy are linked by IS-A (subsumption) relationships in such a way that each hierarchy forms a directed acyclic graph (DAG).

Concepts also have attribute relationships directed to other concepts. These attribute relationships (relationships, for short) serve in definitional capacities. For example, the concept Ear problem (in the Clinical Finding hierarchy) has the relationship finding site to the concept Ear structure (in the Body Structure hierarchy) specifying that Ear structure is the site of Ear problem. In SNOMED, each kind of relationship is defined to span from a source hierarchy to a target hierarchy (perhaps more than one). For example, five kinds of relationships, namely, specimen substance, specimen procedure, specimen source morphology, specimen source topography, and specimen source identity, are defined with the Specimen hierarchy as their source hierarchy. The respective target hierarchies of the first four are Substance, Procedure, Body Structure, and Body Structure. The relationship identity has four target hierarchies itself: Social Context, Physical Object, Qualifier Value, and Environment or Geographical Location.

The basis of the area taxonomy is a partition of the concepts into what we call areas according to their sets of (non-hierarchical) relationships. An area is defined as the complete set of concepts having exactly the same given set of relationships. Formally, let $\{r_1, r_2, \ldots, r_n\}$ be a set of relationships. The area defined with respect to this set of relationships is as follows, where relshps(C) is the entire set of relationships exhibited by the concept C:

$$\text{Area}(\{r_1, r_2, \ldots, r_n\}) = \{C | \text{relshps}(C) = \{r_1, r_2, \ldots, r_n\}\} \quad (1)$$

Given the fact that an area is defined by its set of relationships, we denote it as "$\{r_1, r_2, \ldots, r_n\}$." If a given combination of relationships does not exist (i.e., the set defined in (1) is empty), then the area is excluded from analysis and is deemed not to exist. As an example, in the context of the Specimen hierarchy, there are 380 concepts that have the relationships procedure and topography (and only those relationships). Examples include the concepts Ear swab sample, Specimen from thymus gland obtained by biopsy, and Cervical biopsy sample. Therefore, there is an area named {topography, procedure} in the Specimen hierarchy. Areas are by definition disjoint, i.e., each concept belongs to one and only one area, and they therefore provide a partition of the hierarchy.

The area taxonomy is a directed acyclic graph (DAG) constructed by making each area a node and then arranging them hierarchically—analogously to the underlying concepts—using what we refer to as child-of relationships as edges. The child-of's are derived from the concepts' IS-A links. Before we describe how this is done, we need to define the notion of a root of an area. Let area(C) be the area of concept C, and let parents(C) denote the set of parents of C in the IS-A hierarchy. Definition (Root of an Area): A concept O in area A is a root of A if $\forall C \in \text{parents}(O), \text{area}(C) \neq \text{area}(O)$.

That is, a root is a concept whose parents all reside in other areas, or, in other words, its set of relationships is different from all its parents'. A root is not unique; an area can have more than one of them. Let us note that a root is of considerable significance in the makeup of a SNOMED hierarchy because, from a top-down hierarchical perspective, it is the first concept with a given combination of relationships. In this sense, it constitutes a cornerstone in the successive build-up of knowledge that is a conceptual hierarchy. A child-of link in the area taxonomy is derived as follows. Let A and B be two areas such that a root of A has a parent in B. Then there exists a child-of from A to B. Overall, the collection of area nodes and child-of edges forms a DAG.

Figure 3:
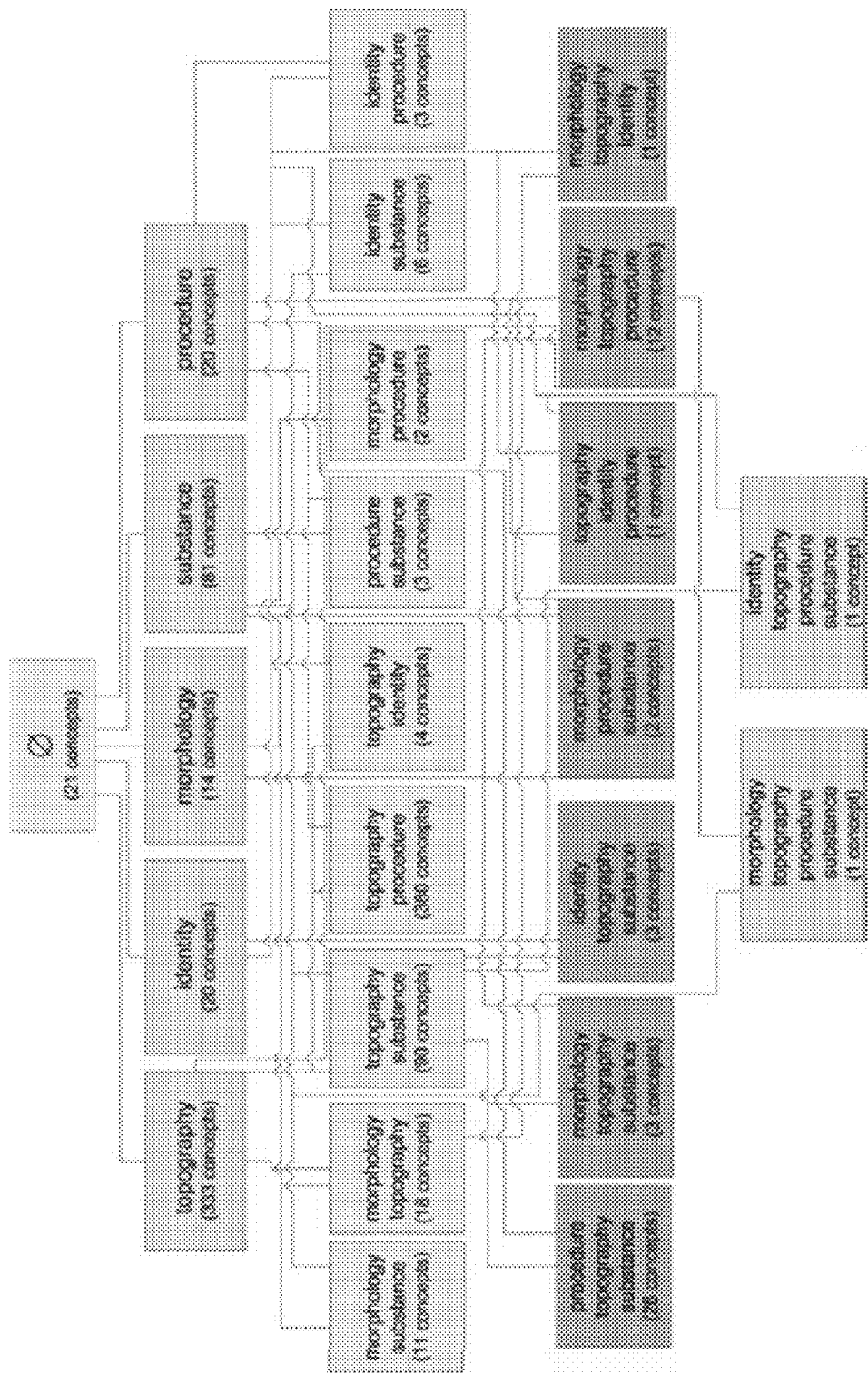
FIG. 3 is a graphical representation of an example of an area taxonomy for a specimen hierarchy according to one or more further aspects of the present invention.
Figure 4A:
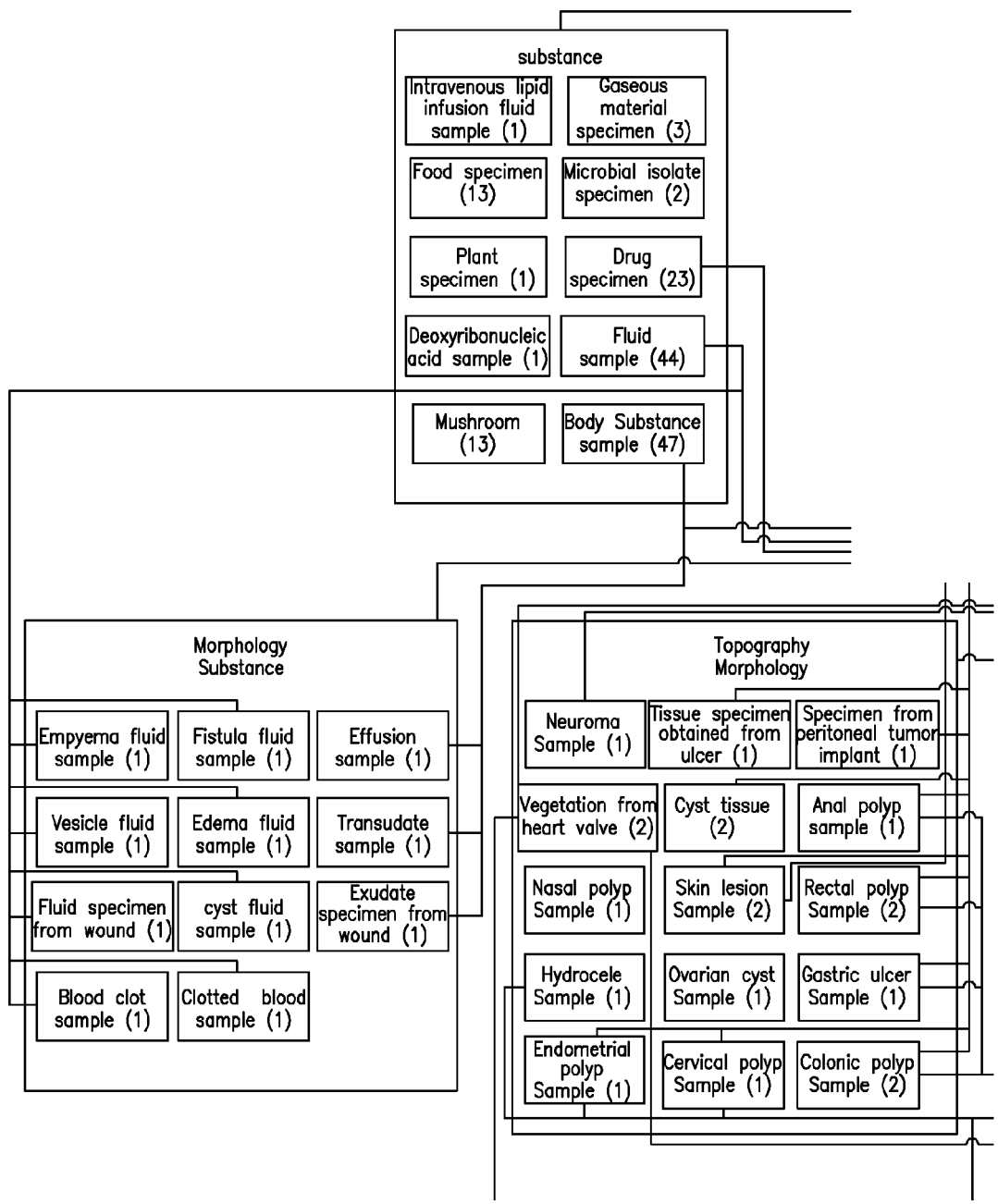
FIGS. 4A-4E are a graphical representation of an example of a partial-area taxonomy for a specimen hierarchy according to one or more further aspects of the present invention.
Figure 4B:
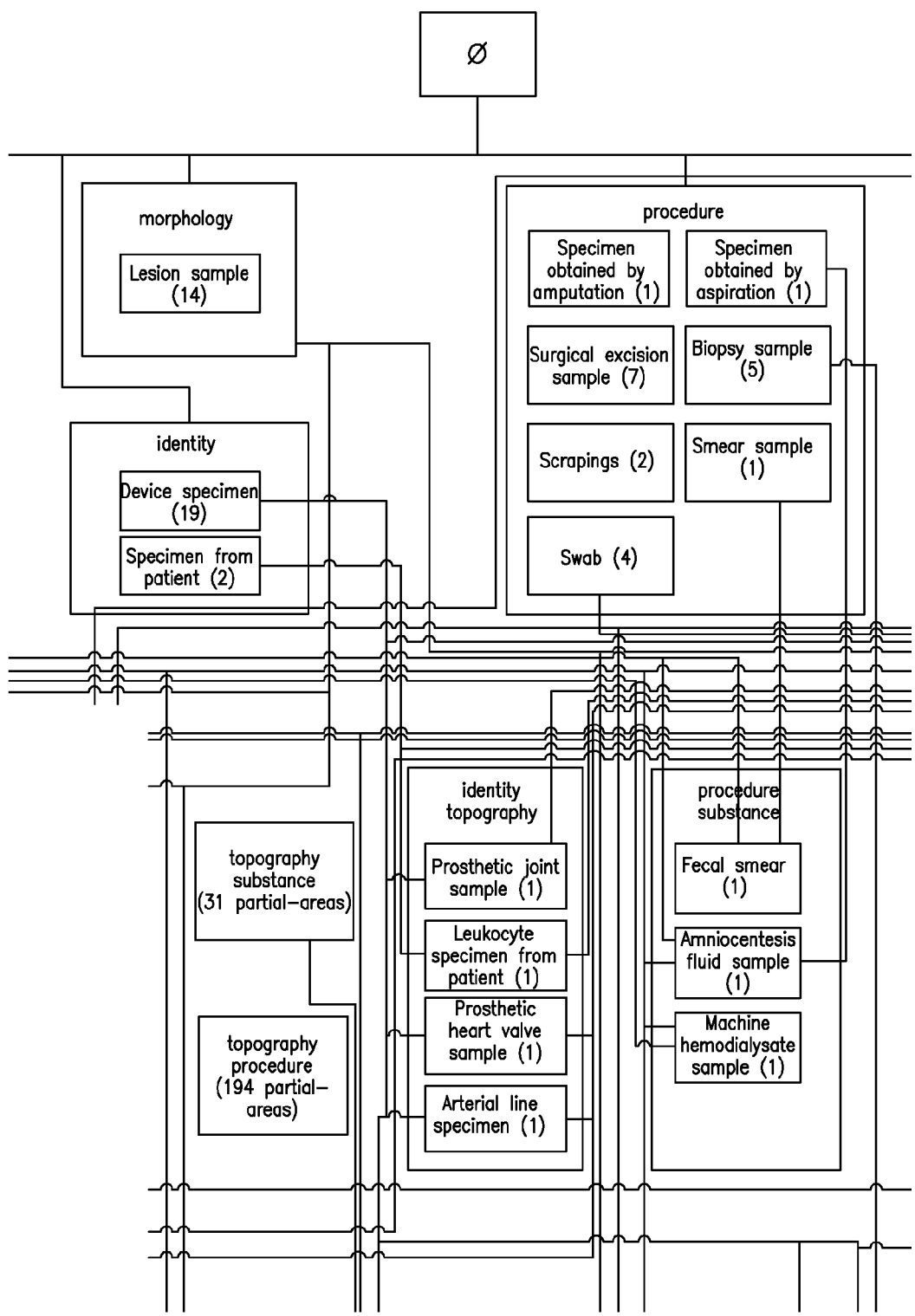
Figure 4C:
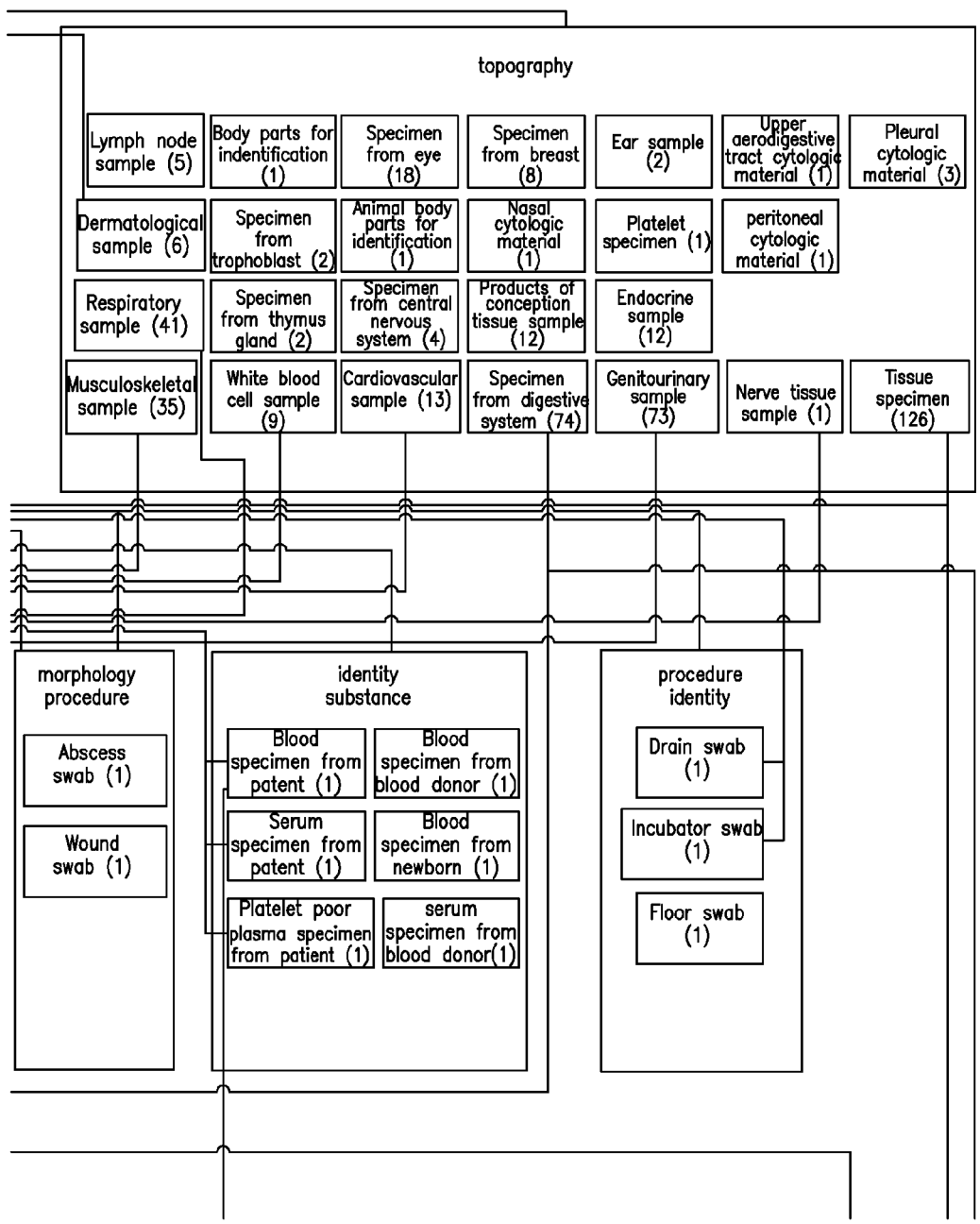
Figure 4D:
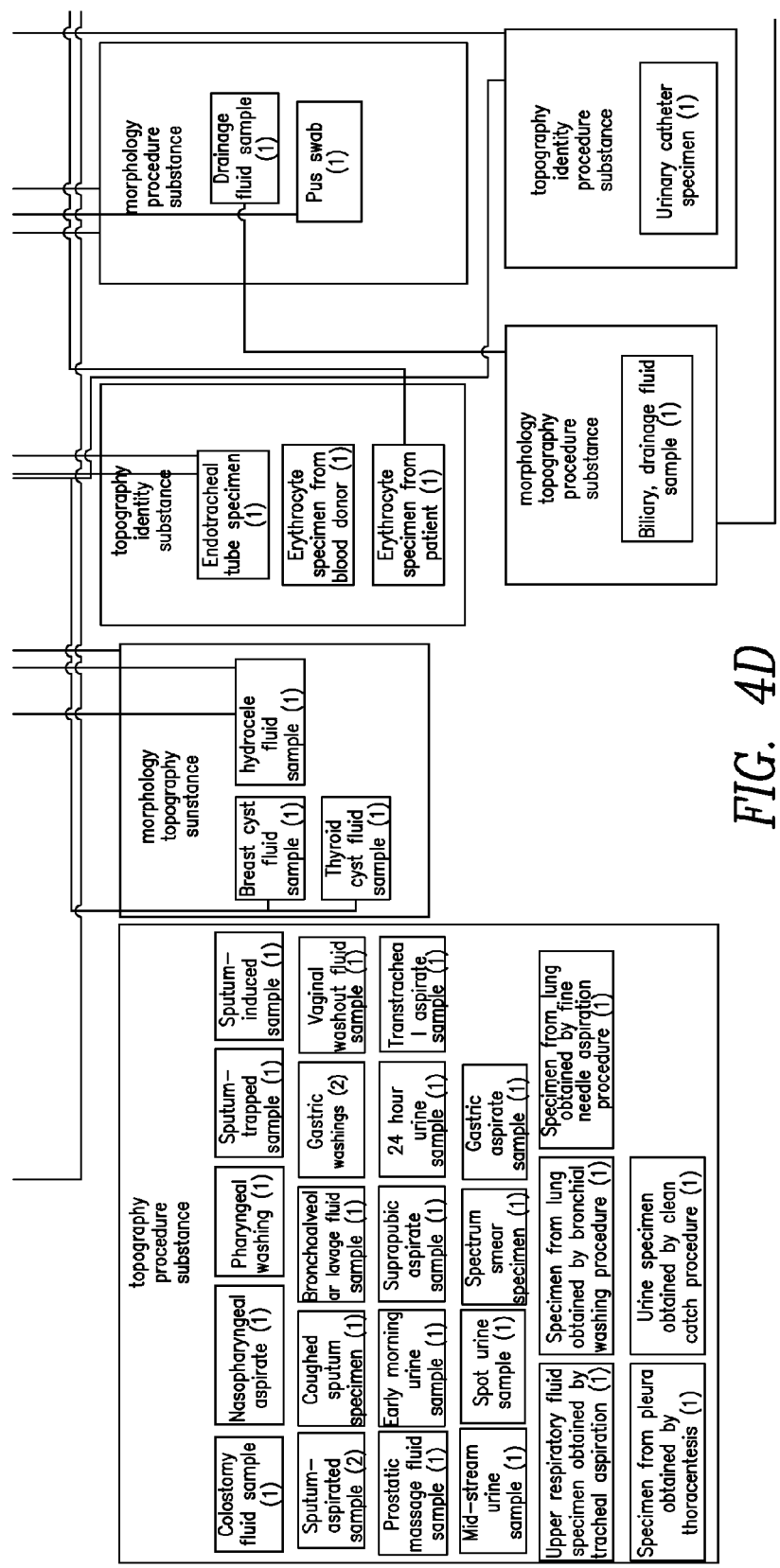
Figure 4E:
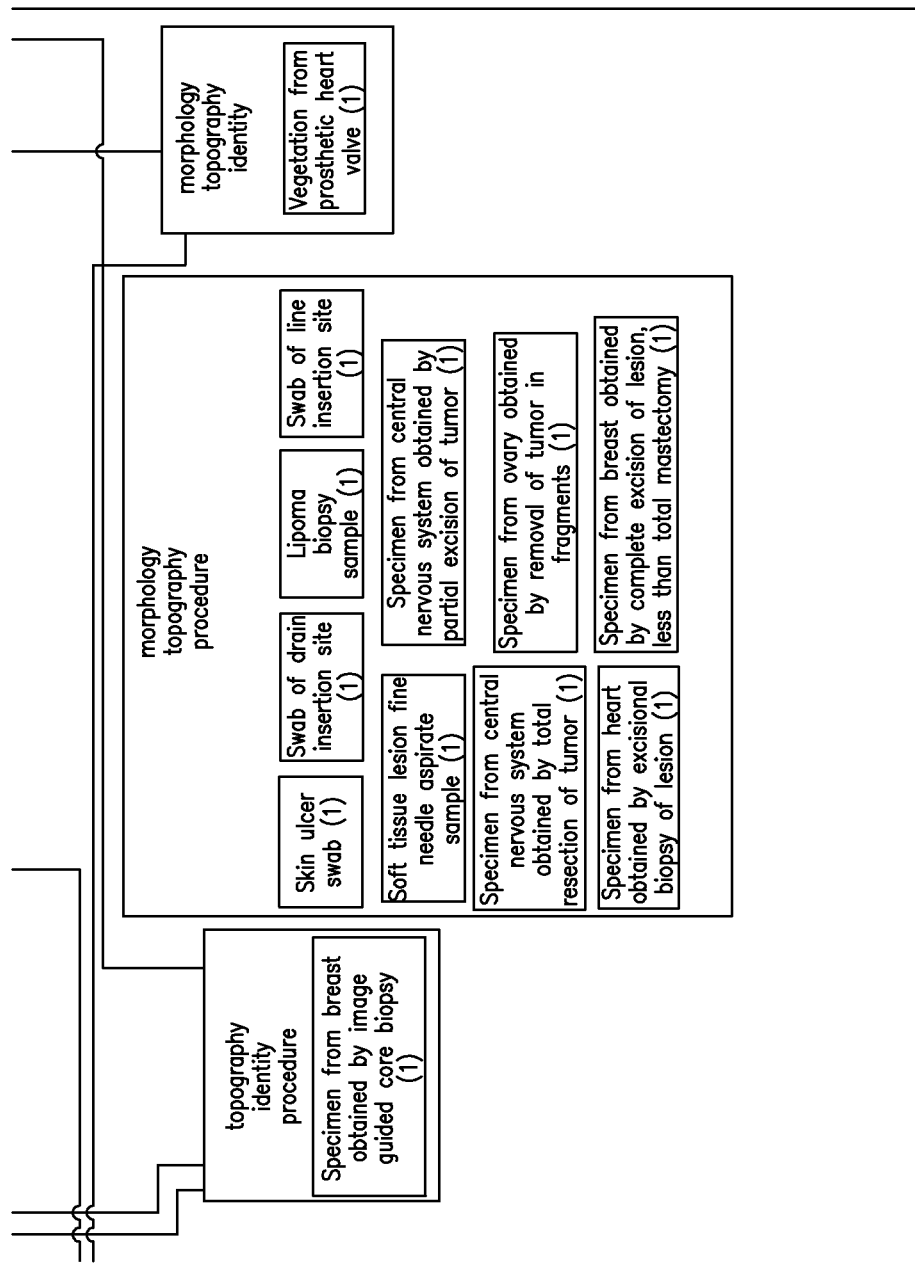

The area taxonomy of the 1,056-concept Specimen hierarchy (July 2007 release) has a total of 24 areas distributed over five levels (FIG. 3). The boxes are the areas and the edges (directed upward) are the child-of's. It should be noted that the top-level area Ø ("empty set") comprises all concepts having no relationships at all. Thus, it has been given the name "Ø" to indicate an empty set of relationships. Note that the color-coded levels of the area taxonomy distinguish the numbers of relationships of the areas. The area Ø is on Level 0 and has zero relationships. The five green rectangles on Level 1 are the areas having exactly one relationship each.

The partial-area taxonomy is designed in an effort to achieve hierarchical coherence in addition to the structural congruity of each of the areas. The network is a refinement of the area taxonomy. As noted, areas may have more than one root. In such a case, each root and its respective collection of descendants (within the area) can be seen as being a distinct unit of subject matter that has the same set of relationships as some other such units. Moreover, that unit of knowledge is hierarchically coherent due to the single root. All concepts in the unit are specializations of the single root. With this in mind, we define the notion of partial-area with respect to a root O. In the following, desc(X, Y) denotes the fact that concept X is a descendant of concept Y in the IS-A hierarchy.

$$\text{Partial-Area}(O) = \{O\} \cup \{C | C \in \text{area}(O) \text{ and desc}(C, O)\} \quad (2)$$

That is, the partial-area is a subset of the area consisting of the root O and all its descendants in the area. The partial-area defined by (2) is named "O" after its constituent root, since it is the defining characteristic.

The partial-areas are drawn as separate nodes in the partial-area taxonomy embedded inside their area nodes, which are retained. The partial-area nodes within a given area are not connected via child-of links. However, partial-areas residing in different areas are connected by child-of's in a manner analogous to that for areas. In the complete partial-area taxonomy, the child-of's between areas are replaced by those between their partial-areas. However, we often use certain abbreviation conventions or abridgment to reduce clutter.

FIGs. 4A-E shows the (abridged) partial-area taxonomy of the Specimen hierarchy. Each partial-area appears as a box inside its area node. In each partial-area node, the number in parentheses is the number of concepts it contains. For example, we see that the area {identity} (second lower green box from left) has two partial-areas, Device specimen and Specimen from patient, of 19 and two concepts, respectively. All 19 concepts of the partial-area Device specimen represent specimens from devices. The partial-area taxonomy has a total of 361 partial-areas. An example child-of can be seen on the left side of the figure extending from partial-area Effusion sample to Body substance sample. Many child-of's have been omitted.

Note that in some areas in FIGS. 4A-E, the numbers of concepts in the partial-areas do not add up to the total number of concepts in the area in FIG. 3. As a matter of fact, the area {substance} only contains 81 concepts, while the sum of concept numbers appearing in parentheses of its partial-areas is 136. This is due to overlaps among partial-areas.

Due to the typically limited availability of resources for auditing, it is important to try to focus efforts on concepts or groups of concepts having a high likelihood of error. In this way, a better return, measured in the number of errors found, can be expected for a given amount of auditing work.

We have proposed and implemented SNOMED auditing regimens that make use of the two programmatically derived taxonomies introduced above. We have shown that the taxonomies are extremely helpful in promoting more efficient and effective auditing. Different kinds of concept errors have been found to manifest themselves as anomalies at the taxonomy level, allowing for efficient discovery. Thus, the partial-area taxonomy has proven to be a useful vehicle for comprehending the overall structure of a SNOMED hierarchy, locating potential errors within it, and identifying modeling aspects that can be improved. However, these taxonomies lack a characteristic we call semantic uniformity that we have found useful in the realms of both comprehension and auditing. This deficiency is due to the potential overlap between partial-areas.

The following example demonstrates this deficiency.

Figure 5:
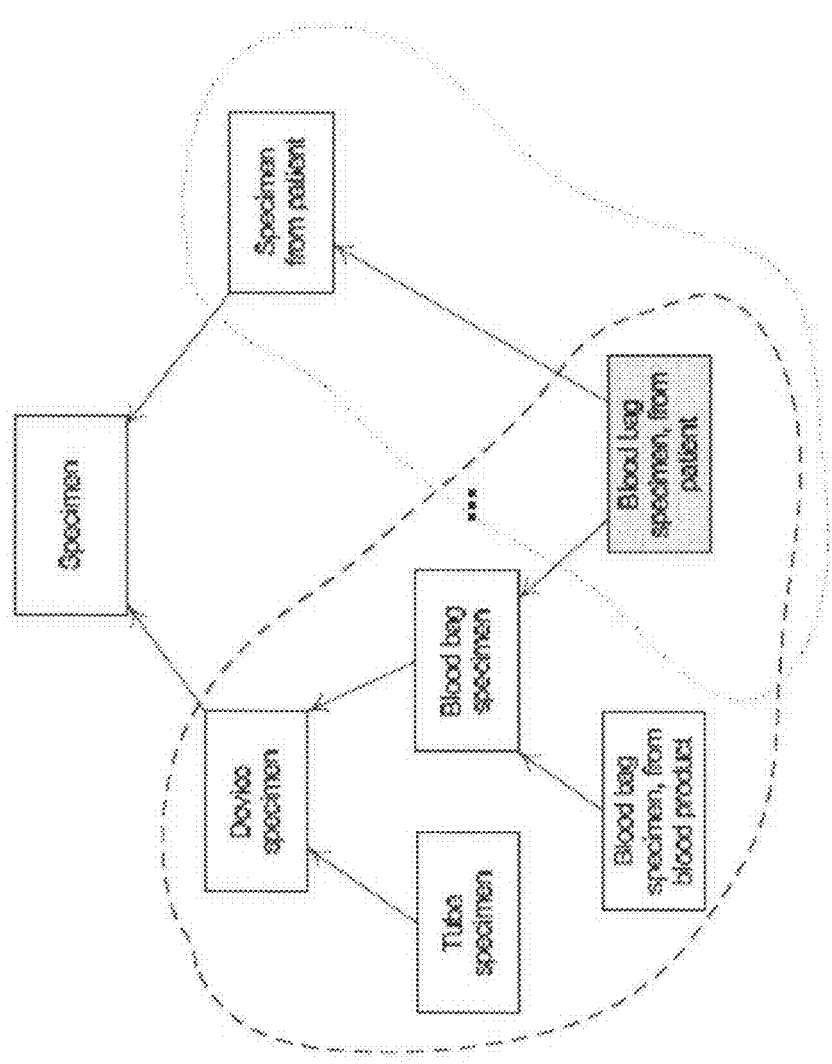
FIG. 5 is a graphical representation of two partial-areas in a specimen hierarchy according to one or more aspects of the present invention.

Referring to FIGS. 4A-E, the area {identity} has two roots, Device specimen and Specimen from patient. Device specimen and its 18 descendants (including Blood bag pecimen) form one partial-area. Specimen from patient and its child Blood bag specimen, from patient form another. Blood bag specimen, from patient also happens to be a child of Blood bag specimen. Thus, Blood bag specimen, from patient is in two partial-areas: Device specimen and Specimen from patient. This situation is illustrated in FIG. 5. These two partial-areas Device specimen and Specimen from patient "overlap" and we call the concept Blood bag specimen, from patient an "overlapping concept." The entire set of overlapping concepts is denoted V. This raises two important issues. First, the entire collection of partial-areas does not form a partition of the hierarchy. This is in contrast to the collection of areas which does. Second, when two partial-areas overlap, some concepts in a partial-area, like the concept Blood bag specimen, elaborate only the semantics of one root (i.e., Device specimen) while the overlapping concepts in that same partial-area, in this case, the concept Blood bag specimen, from patient, elaborate the semantics of two roots (i.e., Device specimen and Specimen from patient). The situation gets worse when there are three overlapping partial-areas, say, $R_1$, $R_2$, and $R_3$. In this situation, some concepts in $R_1$ are elaborating the semantics of the root $R_1$, while others may be elaborating the semantics of the two roots $R_1$ and $R_2$, and others are elaborating the semantics of all three roots $R_1$, $R_2$, and $R_3$. In this sense, the partial-area $R_1$ is not semantically uniform with respect to its root.

To overcome these issues in certain exemplary embodiments of the present invention methods are disclosed wherein overlapping concepts are partitioned systematically such that each resulting group of concepts is singly-rooted. The single root of each such group provides a uniform semantics for the whole group. This is important because the overlapping concepts can collectively constitute quite a tangled hierarchy. The partition paves the way for the formation of an enhanced partial-area taxonomy that provides a view of the prevailing hierarchical configuration of the overlapping concepts. This aids the subject-domain expert editor and user in seeing the gestalt of the partial-area overlaps and more easily comprehending their content. Furthermore, such enhanced comprehension enables an auditor to recognize any troublesome aspect.

Figure 6:
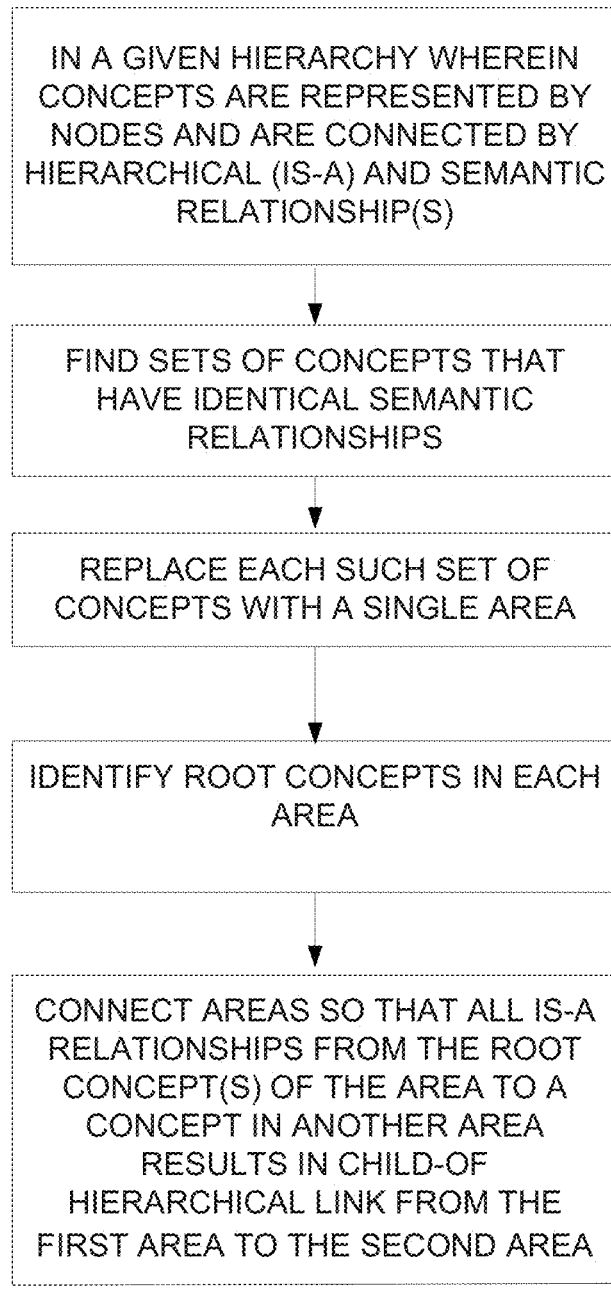
FIG. 6 is a flow diagram indicating certain process steps that may be carried out in accordance with one or more aspects of the present invention.
Figure 7:
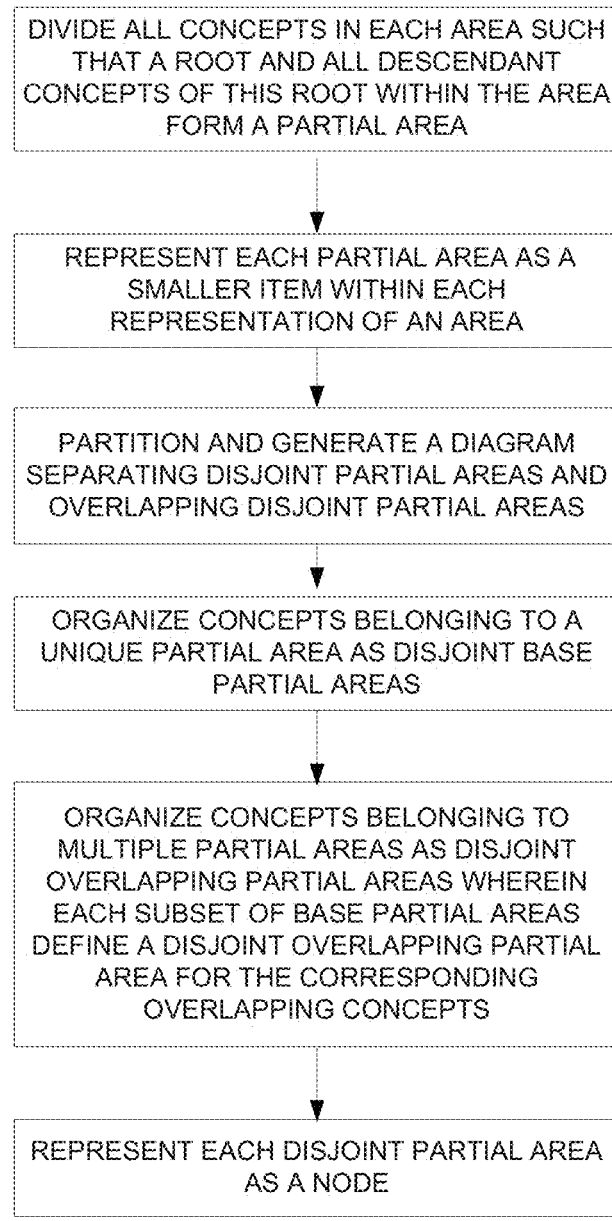
FIG. 7 is a flow diagram indicating certain process steps that may be carried out in accordance with one or more aspects of the present invention.

Now referring to FIG. 6, in accordance with one aspect of the present invention, a method of providing a disjoint partial-area taxonomy is provided, wherein for a given hierarchy whose concepts are represented by nodes and are connected by hierarchical (IS-A) relationships as well as by links representing semantic relationships, there is the identification of sets of concepts in the hierarchy that have identical relationships, the replacement of each set of the concepts with a single area, the identification of root concepts in each such area, and the connection of areas so that all IS-A relationships from the root concept of the area to a concept in another area results in a child-of hierarchical link to the second area. Referring to FIG. 7, the method may further include dividing all concepts in each area such that a root and all descendant concepts of the root form a partial-area, representing each partial-area as a smaller item within each representation of an area, partitioning and generating a diagram separating disjoint partial-areas and overlapping disjoint partial-areas; representing each disjoint partial-area as a node, organizing concepts belonging to multiple partial-areas as disjoint overlapping partial-areas wherein each subset of base partial-areas define a disjoint overlapping partial-area for the corresponding overlapping concepts. The method may include displaying the diagram on a user interface. The representation of a partial-area is a shape within a larger shape. One skilled in the art will recognize a user interface may be a computer screen or screen of a suitable device. Preferably, the diagram is dimensioned to fit on a single computer screen and the text is readable.

In accordance with one embodiment, an apparatus is disclosed, including a processor operating to perform actions in response to executing computer program instructions, the actions including deriving an area taxonomy from a given hierarchy, identifying sets of concepts in the hierarchy that have identical relationships, replacing each set of the concepts with a single area, representing every area as a node connected to other nodes by links representing child-of hierarchical relationships, reflecting hierarchical (IS-A) relationships by identifying root concepts, and connecting areas so that all IS-A relationships from the root concept of the area to a concept in another area results in a child-of hierarchical link to the second area, and further comprising the steps of dividing all concepts in each area such that all descendant concepts of a single root form a partial-area, representing each partial-area as a smaller item within each representation of an area, and partitioning and generating a diagram separating partial-areas into base partial-areas without overlaps and disjoint partial-areas containing overlapping concepts.

In accordance with another embodiment, a non-transitory, computer readable storage medium containing a computer program, which when executed by a computer processor causes the computer processor to perform actions, is disclosed, the actions including the steps set forth above.

From the partition, in one embodiment of the present invention we are able to define a new refined abstraction network for the concepts of a hierarchy such as from SNOMED. This refined abstraction network will better support comprehension of a hierarchy such as a SNOMED hierarchy by maintenance personnel, including editors and auditors, by providing a disjoint partition of the hierarchy's concepts—the overlapping concepts, among them—into semantically uniform groups.

The following examples and discussion, which may refer to SNOMED in many cases, are not limited to the particulars of SNOMED and will be understood by those skilled in the art to apply to any hierarchy. To better understand overlapping concepts and see their inherent complexity, some examples are disclosed utilizing certain exemplary embodiments of the present invention.

In the area {substance} shown in FIGs. 4A-E, the three direct children, Body substance sample, Fluid sample, and Drug specimen, of the top-level concept Specimen induce three partial-areas, respectively. Now referring to FIG. 8, the three root concepts are shown, along with two of their descendants (shaded). The partial-areas are demarcated with dashed bubbles, where the different border styles denote the different partial-areas. Body fluid sample, being a child of both Body substance sample and Fluid sample, resides in the intersection of the two partial-areas. It inherits the relationship substance directed to Body fluid in the Substance hierarchy from both its parents. Interestingly, Body fluid is a child of Body substance and Liquid substance (in the Substance hierarchy), which are the respective targets of the relationship substance from the two parents of Body fluid sample (in the Specimen hierarchy). Hence, the target of the substance relationship of the concept in the intersection of the two partial-areas is a refinement of the targets of the relationships of the two roots of the intersecting partial-areas. This demonstrates the correspondence of the modeling in the sources and targets of the relationship substance.

Figure 8:
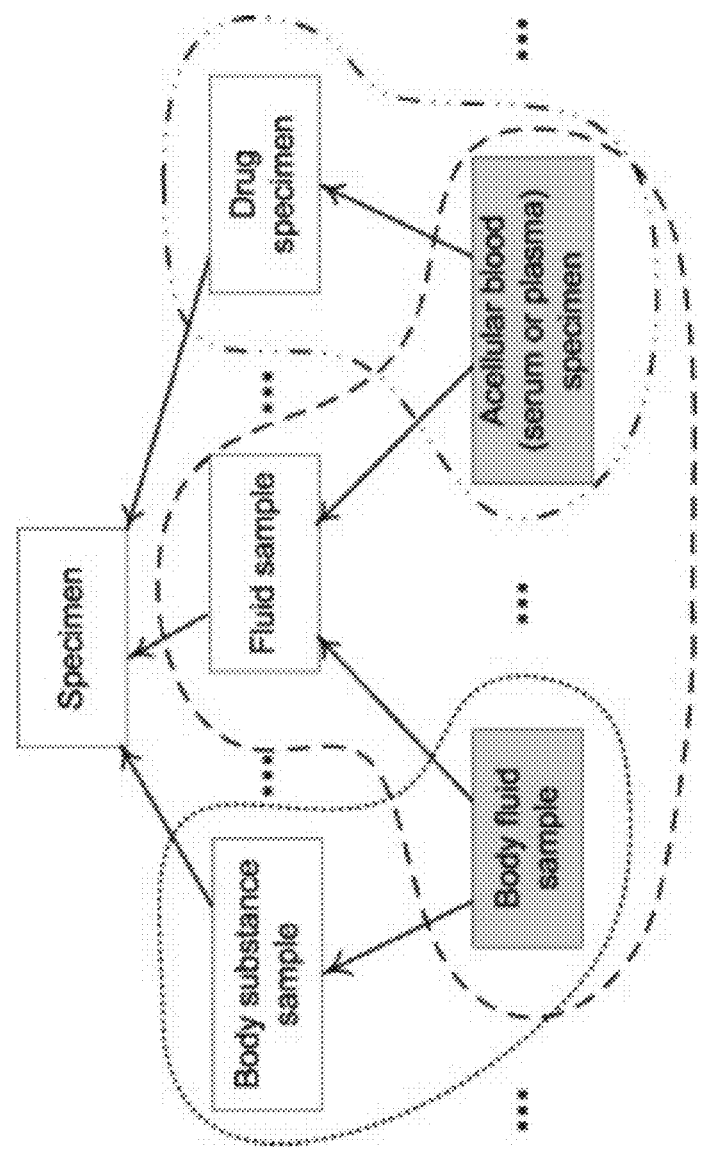
FIG. 8 is a graphical representation of overlapping concepts according to one or more aspects of the present invention.

The other shaded concept in FIG. 8, Acellular blood (serum or plasma) specimen, sits in the intersection of the partial-areas Fluid sample and Drug specimen. Thus, it elaborates the semantics of both parents, and inherits the relationship substance and the accompanying targets. Different from the previous example, Acellular blood (serum or plasma) specimen has two occurrences of the substance relationship, one pointing at Liquid substance and the other pointing at Blood component, a descendant of Drug or medicament, the target of the relationship substance of Drug specimen.

Overall, the area {substance} (FIGS. 4A-E) contains ten partial-areas and has quite a few overlapping concepts. This can be gathered from the fact that the sum of the numbers of concepts in its partial-areas (136) is much higher than the actual number of concepts in the area (81). The increased complexity of overlapping concepts is a consequence of the fact that they represent combination specializations deriving from multiple root concepts. For example, Body fluid sample and all its descendants residing in {substance} are overlapping concepts belonging to the partial-areas Body substance sample and Fluid sample. All these concepts that are both body substance and fluid examples, e.g., Amniotic fluid specimen and Lymph sample, are inherently more complex than concepts that are solely fluid samples, e.g., Water specimen, or only body substance samples, e.g., Calculus specimen. They each elaborate the semantics of a dual specialization.

The amount of overlapping, and attendant complexity, may increase while moving downward along the IS-A hierarchy. In {substance}, there are 15 concepts belonging to exactly two partial-areas, and 20 concepts belonging to three partial-areas. From this, we get the actual number of concepts: 136−(2−1)·15−(3−1)·20=81.

Figure 9:
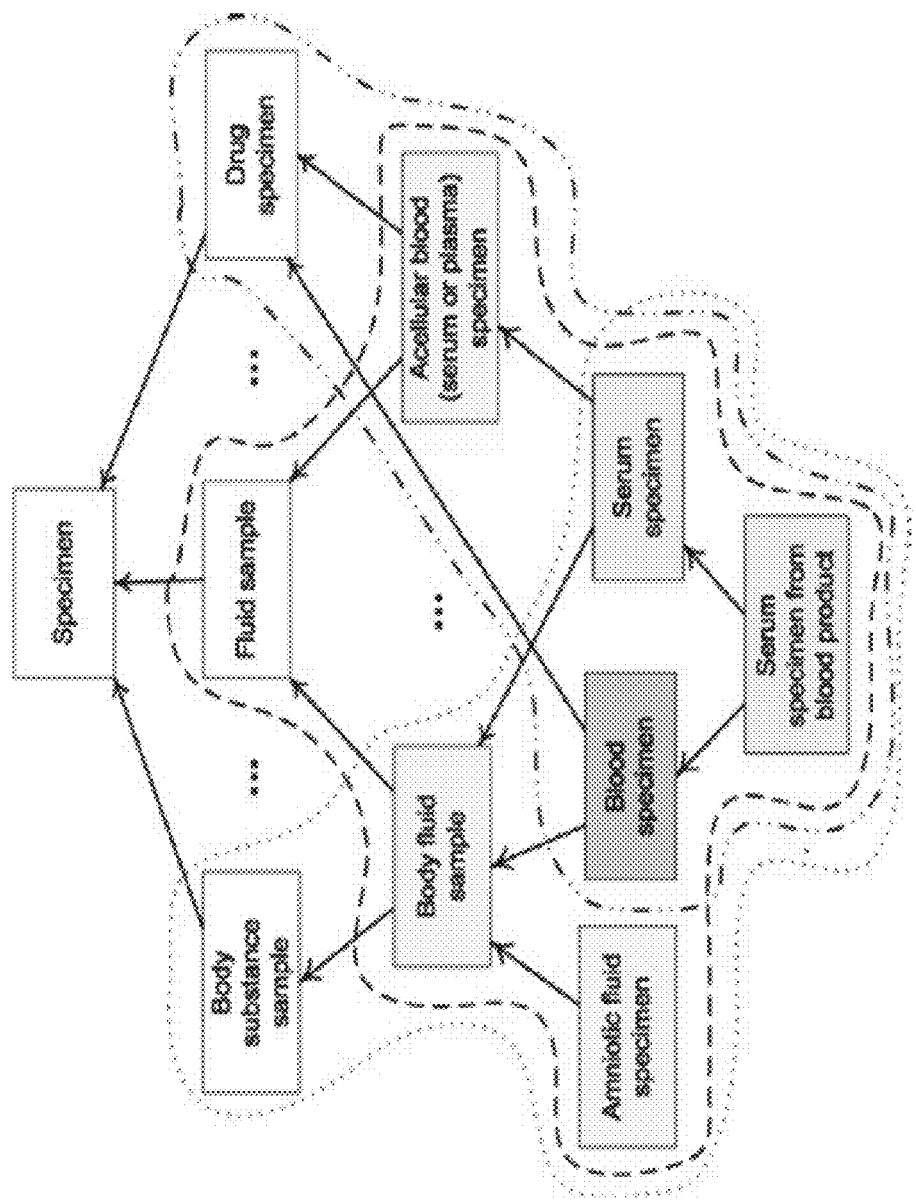
FIG. 9 is a graphical representation of differing degrees of complexity for overlapping concepts according to one or more aspects of the present invention.

Now referring to FIG. 9, differing degrees of complexity are seen for the overlapping concepts, FIG. 9 contains a small fragment of the Specimen hierarchy consisting of nine concepts from the area {substance} (along with the hierarchy's root). The three bubbles with different border styles enclose three partial-areas. Their roots are children of Specimen. All concepts below the roots (in colors) are overlapping concepts. The first of these are the yellow concepts Body fluid sample and Acellular blood (serum or plasma) specimen. Moving downward along the IS-A hierarchy, we find examples of overlapping concepts that are even more complex. For example, one of the children of the overlapping concept Body fluid sample, Blood specimen (in orange), has another parent Drug specimen that is the root of its partial-area. In this case, Blood specimen is the specialization of three roots and thus resides in the intersection of three separate partial-areas. But from the complexity point of view, it is a child of one overlapping concept and one root of a partial-area. Hence, it is more complex than the two yellow overlapping concepts that are children of roots of partial-areas. Other—more complex—cases can be seen with the green concepts, Serum specimen and Serum specimen from blood product, each having two parents that are overlapping concepts themselves. Let us note that a move down the hierarchy does not necessarily imply an increase in complexity. This is illustrated by Amniotic fluid sample, whose only parent is Body fluid sample. Being singly parented, it does not lie at a significant knowledge convergence point and is thus considered no more complex than Body fluid sample from a structural standpoint. As discussed, the portion of an area consisting of the overlapping concepts may constitute a highly tangled hierarchy. In one embodiment of the present invention, order is to be restored to hierarchies by partitioning them in such a way as to obtain a collection of concept groups exhibiting semantic uniformity by satisfying single-rootedness and no overlaps. Thus, one aspect of one embodiment of the present invention requires identification of those overlapping concepts that will serve as the roots of the concept groups. For the present invention, we will call them overlapping roots. Just like the root of a partial-area, an overlapping root captures the overarching semantics of its group of overlapping concepts. The grouping process that we introduce proceeds in a deeply nested (recursive) fashion for multiple embodiments of the present invention. The following examples and discussion, which will be understood by those skilled in the art to apply to any hierarchy, describe overlapping roots.

Two kinds of overlapping roots are defined for embodiments of the present invention: those at the true "tops" of the overlapping portions of the partial-areas and those residing beneath them—perhaps quite deep in the overlap. Let us first define the fundamental kind of overlapping root called a base overlapping root, where, again, V is the entire set of overlapping concepts.

Definition (Base Overlapping Root): A concept $L \in V$ is a base overlapping root if $\forall C \in \text{parents}(L)$, $C \in V$.

FIG. 9 shows examples of overlapping concepts. Among them, for instance, Body fluid sample is a base overlapping root because both of its parents, Body substance sample and Fluid sample, are non-overlapping concepts. They are, in fact, partial-area roots. Another example is Acellular blood (serum or plasma) specimen with the non-overlapping parents Fluid sample and Drug specimen.

In the progressive build-up of knowledge that is a concept hierarchy, the significance of a base overlapping root is that it lies at the confluence of multiple independent lines of knowledge originating from the roots of the area. In this sense, such a concept can be seen as denoting a change of conceptual context within the hierarchy as one moves downward. The roots of a partial-area are significant in terms of unique sets of relationships. The base overlapping roots do not differ from their partial-area roots in regard to their relationships (they have the same relationships, in fact), but each one does represent a new combination in the downward direction of individual knowledge artifacts, each of which was first expressed by some partial-area root. With the definition of base overlapping root now in place, we can define the general notion of overlapping root in a recursive manner as follows.

Definition (Overlapping Root): A concept $L \in V$ is an overlapping root if either (1) it is a base overlapping root; or there exist concepts $C_1$ and $C_2$ ($C_1 \neq C_2$) such that $\text{desc}(L, C_1)$, $\text{desc}(L, C_2)$, and either (2) $C_1$ is an overlapping root and $C_2$ is a partial-area root or (3) both $C_1$ and $C_2$ are overlapping roots. For both Cases (2) and (3), the hierarchical paths from L to $C_1$ and from L to $C_2$ do not contain other (intermediate) overlapping roots.

Note that the qualifying pair of ancestors $(C_1, C_2)$ is not necessarily unique. That is, more than one pair of ancestors might satisfy the requirements. The definition of overlapping root is well illustrated in FIG. 9. The yellow concepts, Body fluid sample and Acellular blood (serum or plasma) specimen, are base overlapping roots (Case (1)). The orange concept Blood specimen follows Case (2) since one parent, Body fluid sample, is an overlapping root and the other, Drug specimen, is a partial-area root. Finally, the green concepts Serum specimen and Serum specimen from blood product are overlapping roots according to Case (3) since each is a child of two overlapping roots.

Case (1) denotes the fact that base overlapping roots, defined above, form the foundation upon which other overlapping roots are defined. Cases (2) and (3) of the definition (the recurrences) designate certain points in the hierarchy below the level of the base overlapping roots as being significant convergences of knowledge and thus warranting new grouping structures. A concept satisfying Case (2) or Case (3) in particular is called a derived overlapping root.

In FIG. 9, Blood specimen is a derived overlapping root according to Case (2). Its two qualifying ancestors are its parents Body fluid sample, a base overlapping root, and Drug specimen, a partial-area root. Serum specimen and Serum specimen from blood product are also derived overlapping roots. The two parents of Serum specimen are base overlapping roots. On the other hand, the two parents of Serum specimen from blood product are both derived overlapping roots.

Figure 10A:
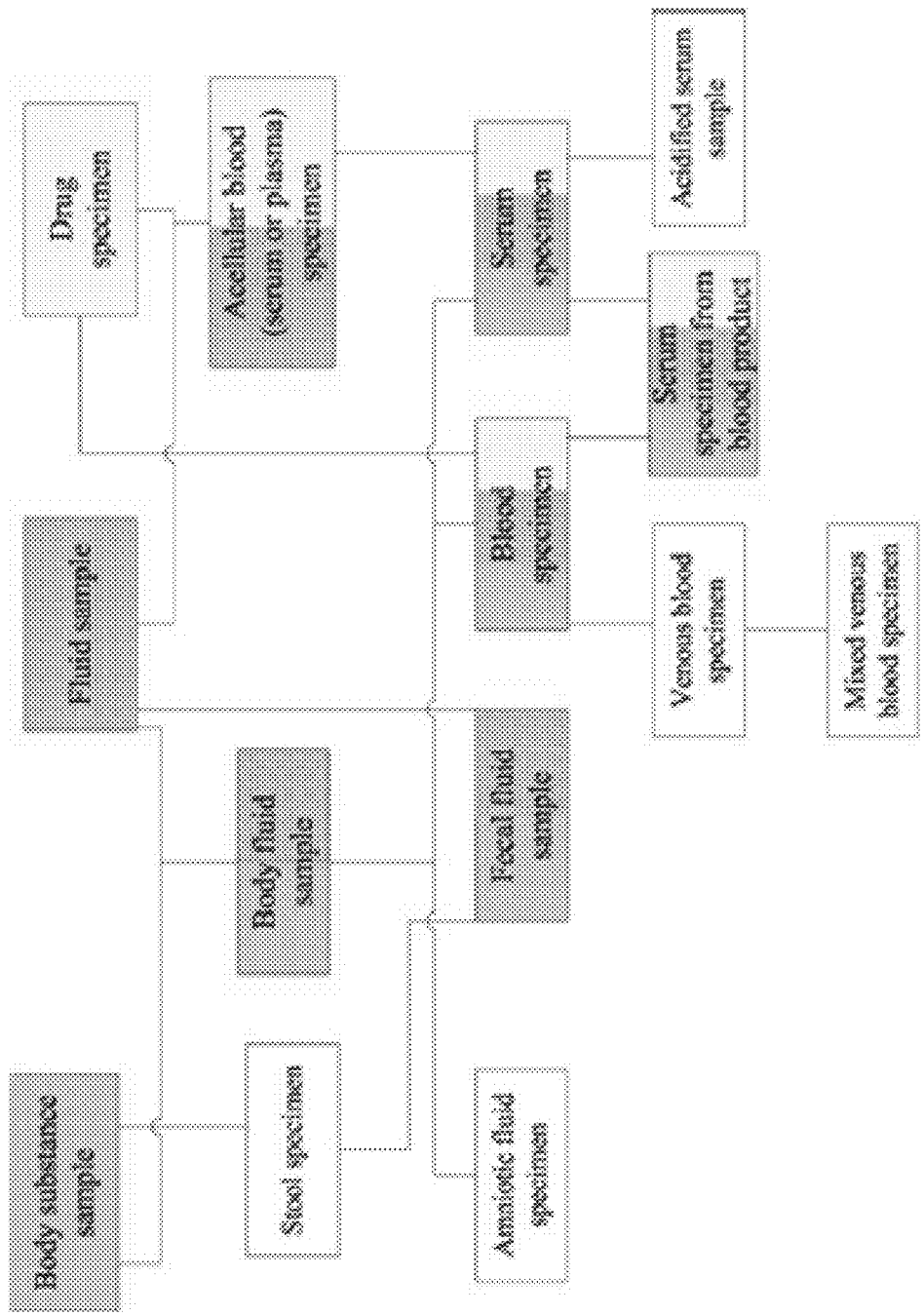
FIG. 10A is a block diagram of an excerpt of overlapping roots from the area {substance} in a specimen hierarchy according to one or more aspects of the present invention.

Now referring to FIG. 10A, an excerpt of the Specimen hierarchy's area {substance}—some of which is depicted in FIG. 9—shows six of its overlapping roots, highlighted with multi-coloring. All lines in FIG. 10A are IS-As. This coloring scheme allows for easy identification of an overlapping root's respective partial-area root ancestors. The three partial-area roots are the single-colored concepts on the top level of FIG. 10A. So, for example, Body fluid sample, colored orange and blue on the second level, is an overlap-ping root that is a descendant of Body substance sample (orange) and Fluid sample (blue). In fact, it happens to be a child of both and is thus a base overlapping root. In the second level (reading from top to bottom), another base overlapping root Acellular blood (serum or plasma) specimen is found, colored blue and yellow, as well as the non-overlapping concept Stool specimen, a descendant of only one partial-area root Body substance sample. Fecal fluid sample, colored orange and blue on the third level, is also a base overlapping root due to the fact that its two parents are non-overlapping concepts. The derived overlapping roots of said embodiment begin to appear on that level, too. They are the two concepts Blood specimen and Serum specimen, both colored orange, blue, and yellow. Blood specimen is a child of one base overlapping root, Body fluid sample, in the second level and one partial-area root, Drug specimen (see Case (2) of the definition). Serum specimen is a child of the two base overlapping roots in the second level (Case (3)). Both have descendants that are not overlapping roots. For example, Mixed venous blood specimen at the bottom is an overlapping concept but not an overlapping root. On the fourth level, we find the last derived overlapping root Serum specimen from blood product. Overall, there are three base overlapping roots and three derived overlapping roots. In this example, all the base overlapping roots are two-colored, while the derived are three-colored, though that would not always be the case. Uncolored boxes are not overlapping roots.

It should be noted that in certain embodiments of the present invention, overlapping concepts having a single parent cannot be overlapping roots. Again, the purpose of this designation is to highlight knowledge convergence points for which multiple parents are necessary. As an example, the concept Acidified serum sample has as its only parent the derived overlapping root Serum specimen and is thus not an overlapping root. Similarly, the derived overlapping root Blood specimen has 12 descendants, such as Whole blood sample, Arterial blood specimen, and Cord blood specimen, none of which are overlapping roots (these descendants are not shown in the excerpt in FIG. 10A. As these examples demonstrate, there are overlapping concepts that are not overlapping roots, even though their parents are derived overlapping roots.

With the definition of overlapping root in place, one can proceed to establish a partition of an entire area whose partial-areas overlap in certain embodiments of the present invention. Moreover, each of the concept groups collectively forming the partition will be singly-rooted. Such concept groups are referred to as disjoint partial-areas (also referred to as d-partial-areas, for convenience). The initial set of d-partial-areas is derived by removing those portions of the original partial-areas that constitute overlaps, leaving only non-overlapping concepts. For example, the d-partial-area Body substance sample contains one additional concept Stool specimen beyond its root. It is obtained from the original partial-area of the same name having 47 total concepts by removing the overlapping roots Fecal fluid sample and Body fluid sample along with the latter's descendants (see FIG. 10A). Clearly, such d-partial-areas are all disjoint with respect to each other and also with respect to the entire set of overlapping concepts. And they are each singly-rooted.

The remainder of the d-partial-areas are created in the context of the set of overlapping concepts based on the overlapping roots. In fact, each overlapping root will be the root of its own newly derived d-partial-area. Intuitively, such a d-partial-area is the portion of the area residing "between" an overlapping root, say, $C_R$ and the descendants of $C_R$ that are also overlapping roots. For example, consider the overlapping root Body fluid sample. The concepts that are removed in order to form its d-partial-area are the overlapping root child Blood specimen along with all its respective descendants and the other overlapping root child Serum specimen with its two children (FIG. 10A). The concepts that are left in the d-partial-area rooted at Body fluid sample are, besides itself, its seven children (e.g., Amniotic fluid specimen) and its grandchildren which are children of the child Cerebrospinal fluid sample.

More formally, let $C_R$ be an overlapping root. Then it is designated as the root of its own d-partial-area with the name "$C_R$." Furthermore, let C be an overlapping concept—but not an overlapping root—which is a descendant of $C_R$ such that there are no other overlapping roots on the paths between C and $C_R$. Then C is a member of the d-partial-area $C_R$. For example, consider the overlapping root Blood specimen and its descendant Mixed venous blood specimen in FIG. 10A. Since the intermediate concept Venous blood specimen on the only path from Mixed venous blood specimen to Blood specimen is not an overlapping root, Mixed venous blood specimen belongs to the d-partial-area Blood specimen. It is possible to prove that $C_R$ is unique for any given C, and hence C's membership in a d-partial-area is well-defined. Moreover, it is possible to prove that for each overlapping concept C there is always such a $C_R$.

In one embodiment of the present invention, from the d-partial-areas, an abstraction network can be formed that enhances the previously described partial-area taxonomy framework and highlights the structural subtleties of the overlapping portions of the partial-areas. This embodiment of the present invention is called the disjoint partial-area taxonomy (also referred to herein as d-partial-area taxonomy, for convenience). Those d-partial-areas derived directly from the existing partial-areas—and consisting only of non-overlapping concepts—hold the same place as their predecessors in the d-partial-area taxonomy. For said embodiment, partial-areas originally having no overlapping concepts retain their places as nodes and are also designated d-partial-areas in the new network. The child-of relationships emanating from these d-partial-areas and extending into other areas are derived as done previously for the partial-areas.

Figure 10B:
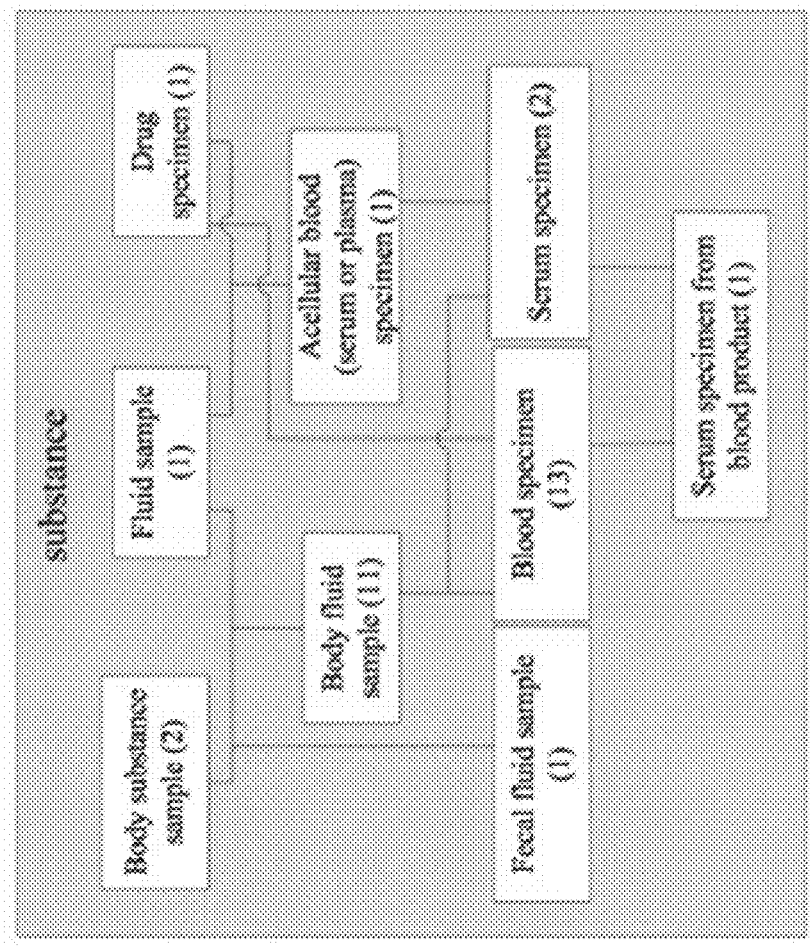
FIG. 10B is a block diagram of a corresponding excerpt of d-partial-area taxonomy representation of {substance} according to one or more aspects of the present invention.

The d-partial-areas comprising overlapping concepts are also elevated to the status of nodes in the d-partial-area taxonomy of said embodiment. Each is displayed as a box with its name (i.e., its unique overlapping root) inside and its number of concepts in parentheses. Child-of links are defined for these new nodes in a similar manner to those for areas and partial-areas, but here the overlapping roots play a role. Let A and B be two d-partial-areas, such that the concept A (the overlapping root of the former) has a parent in the latter. Then there exists a child-of from the d-partial-area A to the d-partial-area B. A portion of the d-partial-area taxonomy for the area {substance} derived from the excerpt of its hierarchy shown in FIG. 10A can be seen in FIG. 10B. For example, there is a child-of from the d-partial-area Fecal fluid sample to the d-partial-area Body substance sample since, in FIG. 10A, there is an IS-A from the concept Fecal fluid sample to the concept Stool specimen which resides in Body substance sample. As can be seen in FIG. 10B, the d-partial-area nodes, like the partial-area nodes, are embedded in their respective area, which in this case is {substance}, colored green following FIG. 3.

The described taxonomies for certain embodiments of the present invention provide abstraction-level views of the content of a hierarchy such as found in SNOMED. For example, the area taxonomy (FIG. 3) shows that there are 81 concepts having exactly the one relationship substance. The partial-area taxonomy (FIGS. 4A-E) also conveys the overarching semantics of these concepts. There are 44 fluid samples, 23 drug specimens, 47 body substance samples, and 13 food specimens. Those four large groups constitute most of the concepts representing specimens with only one relationship to the Substance hierarchy of SNOMED. There are some other small groups, including Gaseous material specimen (3), Microbial isolate specimen (2), and Plant specimen (1). Reviewing this information, the user gets a summary of the content of this area. In contrast, the area {morphology} has just one partial-area Lesion sample of 14 concepts.

As seen in one embodiment of the present invention, when users want to view concepts with both substance and morphology relationships, they can utilize the area {morphology, substance} in the second level having 11 concepts. This area is a child of both {substance} and {morphology} (FIG. 3). As it happens, the area has 11 partial-areas of one concept each, e.g., Effusion sample and Cyst fluid sample (FIGS. 4A-E). As discussed above, and in Y. Wang et al., Structural methodologies for auditing SNOMED, Journal of Biomedical Informatics 40 (5) (2007) 561-581 and M. Halper, et al., Analysis of error concentrations in SNOMED, in: J. M. Teich, J. Suermondt, G. Hripcsak (Eds.), Proc. 2007 AMIA Annual Symposium, Chicago, Ill., 2007, pp. 314-318, this view provided by the partial-area taxonomy was very helpful in exposing errors in the Specimen hierarchy.

The partial-area taxonomy view is particularly useful when the different partial-areas of an area are disjoint, but it is somewhat deficient when the partial-areas overlap. As was discussed above, those overlapping parts of a partial-area contain concepts that are semantically more complex than concepts of non-overlapping parts of the same partial-area. Furthermore, the unit of a partial-area with an overlap is not semantically uniform. Hence, the difficulty of comprehending such concepts is magnified. For example, out of the 23 drug-specimen concepts in the partial-area of that name in the area {substance}, 21 are also fluid samples, while 20 are also body substance samples. Furthermore, 12 concepts are both fluid samples and body substance samples. Hence, the knowledge conveyed by the partial-areas of the area {substance} (FIGs. 4A-E) is hiding a more complex situation. They provide a relatively superficial perspective where a more refined view is needed. Furthermore, as shown in FIG. 3, the area {substance} contains only 81 concepts, where overlapping concepts appear in multiple counts of the sizes of the partial-areas in FIGS. 4A-E.

The desired refined view of an area with overlapping partial-areas is provided by the d-partial-area taxonomy introduced in embodiments of the present invention. In FIG. 10B, one can see that the overlap of the three partial-areas just discussed is concentrated under two d-partial-areas: Body fluid sample of 11 concepts, capturing an overlap of Body substance sample and Fluid sample; and Acellular blood (serum or plasma) specimen of one concept, capturing an overlap of Drug Specimen and Fluid sample. In certain embodiments of the present invention utilizing the d-partial-area taxonomy, the children of these two d-partial-areas, Blood specimen of 13 concepts and Serum specimen of two concepts, denote the overlaps of the three partial-areas. In turn, a deeper level of overlap is indicated by the grandchild d-partial-area Serum specimen from blood product of one concept. As seen in one embodiment of the present invention, the names (overlapping roots) of the d-partial-areas communicate more precise knowledge of the content of the overlapping concepts. The full d-partial-area taxonomy for that portion of the area {substance} from which FIG. 10B was extracted appears below.

Figure 11:
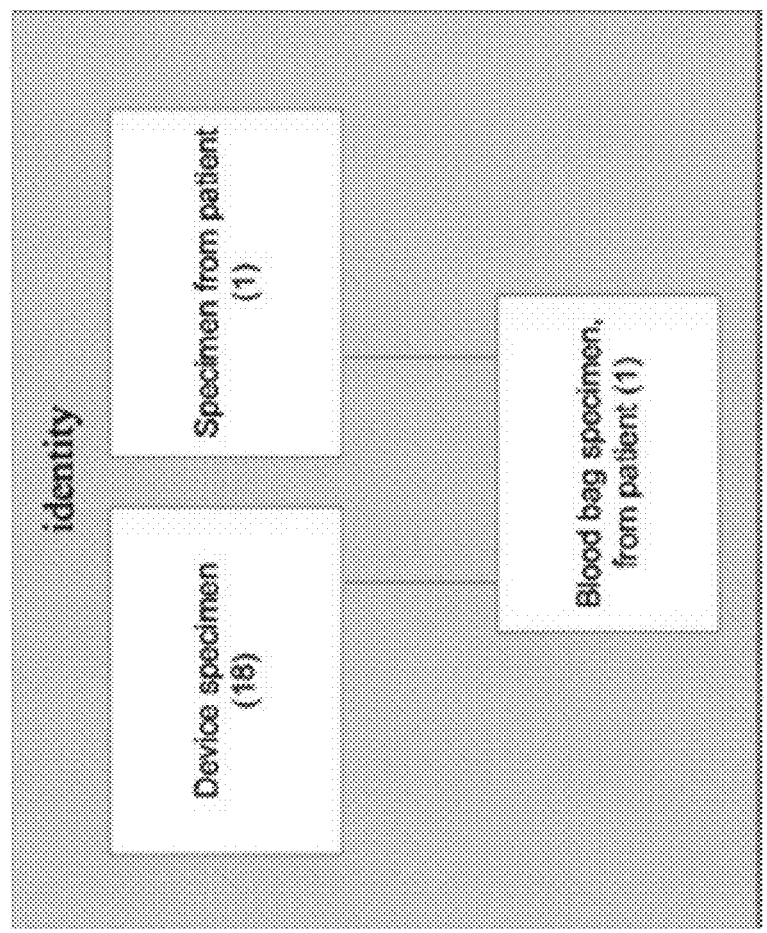
FIG. 11 is a block diagram of d-partial-areas of the area {identity} according to one or more aspects of the present invention.

Importantly, each d-partial-area of the overlapping concepts of certain embodiments of the present invention comprise semantically uniform groups, where its name, e.g., Blood specimen, characterizes the concepts of the group very well. Hence, the d-partial-area taxonomy of certain exemplary embodiments of the present invention is a vehicle for more readily comprehending the nature of the overlapping concepts. In another example corresponding to FIG. 5, there is a minimal overlap of just one concept, Blood bag specimen, from patient, between the two partial-areas, Device specimen and Specimen from patient. This overlap appears as one d-partial-area, Blood bag specimen, from patient, containing only that concept. Note that in the d-partial-area taxonomy, this d-partial-area is the child of the two semantically uniform d-partial-areas Device specimen (18) and Specimen from patient (1), which are now uniform due to the removal of the overlapping concept, referring now to FIG. 11. Thus, the d-partial-area taxonomy reveals both the uniform semantics of the overlapping subgroup and the precise size of its extent (by the number appearing alongside the name) as well as the uniform semantics of the d-partial-areas obtained by the removal of the overlapping concepts from the partial-areas of the partial-area taxonomy. This enhanced view afforded by the d-partial-area taxonomy supports a better auditing regimen for the complex overlapping concepts.

There are two issues regarding the display of the d-partial-area taxonomy of certain embodiments of the present invention. One is the arrangement of d-partial-areas within an area. In the partial-area taxonomy (e.g.,FIGS.4A-E), no child-of hierarchical relationships exist between partial-areas of the same area because each is based on and contains a root of the area. When we display one partial-area below another (see, e.g., the area {substance} in FIGS. 4A-E), no hierarchical arrangement is implied. It is just a layout expediency. In multiple embodiments of the present invention, there are child-of's between d-partial-areas in a given area. In fact, any d-partial-area rooted at an overlapping root (be it base or derived) has multiple child-of's to other d-partial-areas of the same area. To reflect the hierarchical nature of these child-of's, we try to position the d-partial-areas such that they are below their respective parents, and the child-of's are in an upward direction. As a result, there is a contrast between the detailed display of an area of many overlapping concepts, such as {substance} in FIG. 10B, and an area without overlapping concepts, such as {morphology}. The d-partial-area taxonomy contains both kinds of areas. Thus, there is a disparity in the display of these two kinds of areas in regard to their nature and level of detail. As discussed below, in one embodiment of the present invention, the three taxonomies are best used in concert in a kind of multi-scale display.

The July 2007 release of the Specimen hierarchy of SNOMED consists of 1,056 active concepts, of which 162 are overlapping. Most of the overlapping concepts reside in the first level areas, i.e., those having one relationship. In fact, roughly one third (155 out of 468) of the first level concepts are overlapping, and these are found primarily in {topography} and {substance}.

Overlapping concepts also appear in the partial-areas of areas with two relationships, but in far fewer numbers. In fact, there are only seven of them. Six are in {topography, procedure}, and the other is in {topography, morphology}. The statistics of the overlapping concepts in the first and second Levels (reading from top to bottom) are given in Table 1. For each area, listed are its total number of concepts C (Column 2), number of overlapping concepts V (Column 3), the percentage of overlapping concepts (Column 4), the number of d-partial-areas with overlapping roots D (Column 5), and the average number of overlapping concepts per d-partial-area: V/D (Column 6). For example, {substance} has 81 concepts and 35 of them are overlapping (43%). It also has nine overlapping roots which head d-partial-areas, with about four concepts per each such d-partial-area, on average.

TABLE 1

Statistics of overlapping concepts at Levels 1 and 2

| Area | C | V | V/C (%) | J | Avg = V/J |
|---|---|---|---|---|---|
| substance | 81 | 35 | 43 | 9 | 3.9 |
| topography | 333 | 116 | 35 | 52 | 2.2 |
| procedure | 20 | 3 | 15 | 3 | 1.0 |
| identity | 20 | 1 | 5 | 1 | 1.0 |
| topography, procedure | 380 | 6 | 2 | 6 | 1.0 |
| topography, morphology | 18 | 1 | 6 | 1 | 1.0 |
| Total: | 852 | 162 | 19 | 72 | 2.3 |

C = # concepts;
V = # overlapping concepts;
J = # overlapping roots

Most overlapping concepts in the area {topography} are found in intersections with the partial-area Tissue specimen which contains 126 concepts. These results are tabulated separately in Table 2. For example, the partial-area Specimen from eye has 18 concepts. Its intersection with Tissue specimen has 12 of them (67%).

TABLE 2

Intersections involving partial-area Tissue specimen

| Second Partial-Area | C | V | V/C (%) |
|---|---|---|---|
| Specimen from eye | 18 | 12 | 67 |
| Ear sample | 2 | 1 | 50 |
| Specimen from breast | 8 | 4 | 50 |
| Cardiovascular sample | 13 | 3 | 23 |
| Products of conception tissue sample | 12 | 3 | 8 |
| Genitourinary sample | 73 | 22 | 27 |
| Dermatological sample | 6 | 2 | 33 |
| Spec. from digestive system | 74 | 30 | 39 |
| Musculoskeletal sample | 35 | 22 | 63 |
| Respiratory sample | 41 | 7 | 16 |
| Endocrine sample | 12 | 3 | 25 |
| Specimen from central nervous system | 4 | 1 | 25 |
| Spec. from thymus gland | 2 | 1 | 50 |
| Specimen from trophoblast | 2 | 1 | 50 |
| Total: | 302 | 112 | 35 |

Figure 12:
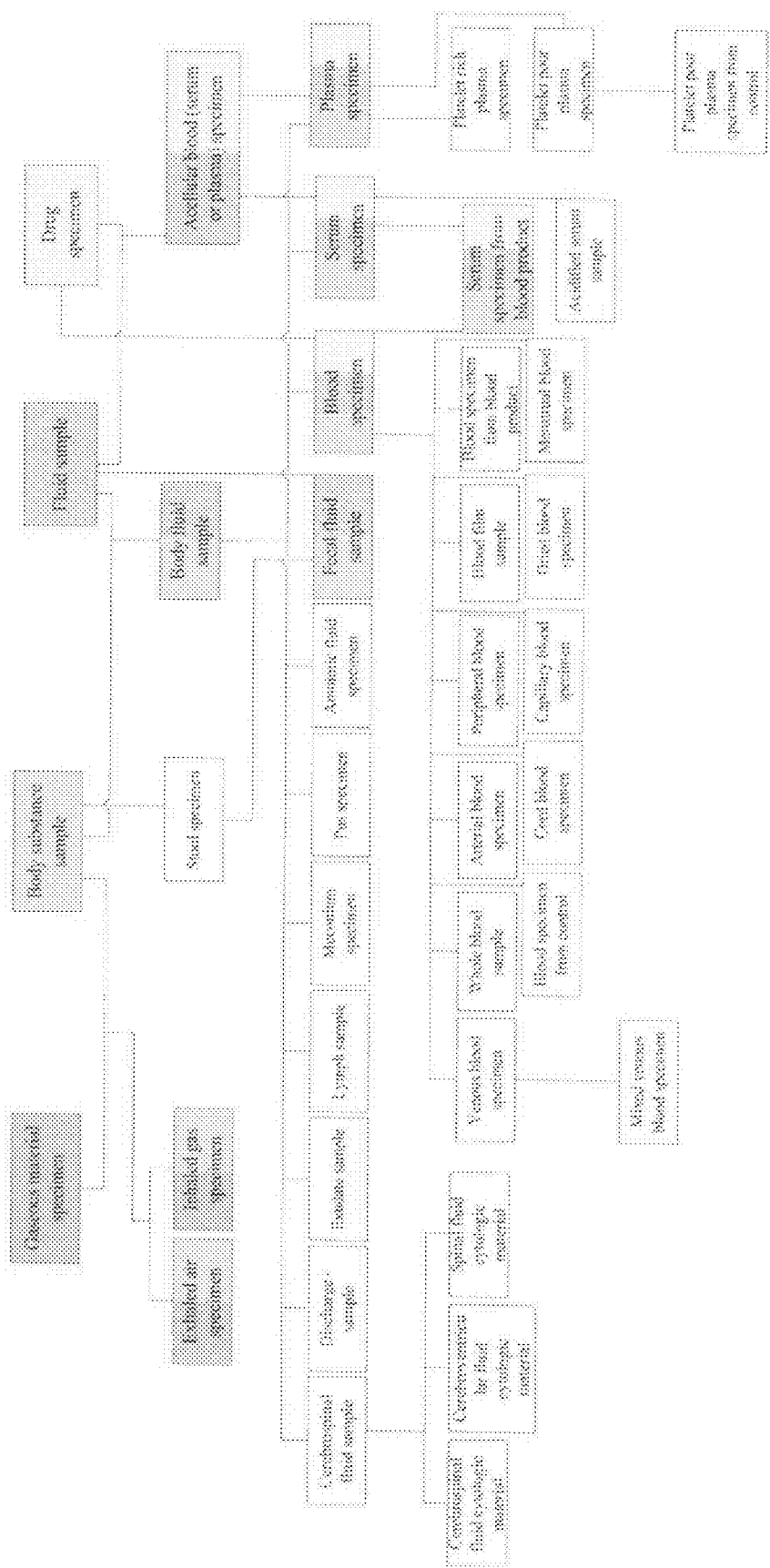
FIG. 12 is a block diagram of overlapping roots from the area {substance} in a 2007 SNOMED release according to one or more aspects of the present invention.

The full complement of nine overlapping roots from the area {substance} can be seen as the multi-colored boxes in the excerpt in FIG. 12. FIG. 12 follows the color conventions of FIG. 10A. The top four concepts are the area's roots. Among the overlapping roots, five are base overlapping roots and four are derived overlapping roots. The remaining white concepts are overlapping concepts that elaborate the semantics of the overlapping roots of their respective d-partial-areas.

Figure 13:
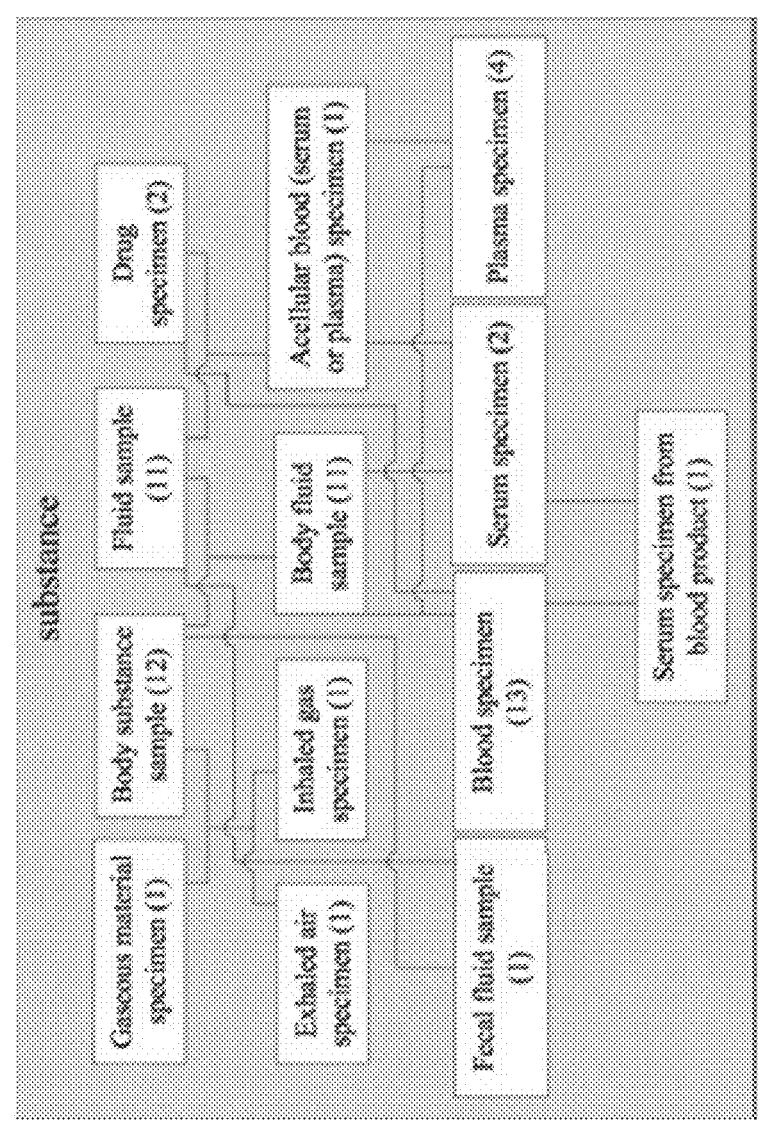

The portion of the d-partial-area taxonomy of one embodiment of the present invention for the area {substance} corresponding to the concept diagram in FIG. 12 is shown in FIG. 13. FIG. 13 presents a precise abstraction of the configuration of the overlapping concepts within {substance} for one embodiment of the present invention. Note that the numbers of concepts listed for the top-level d-partial-areas are actually the numbers of non-overlapping concepts appearing in the original partial-areas from which these d-partial-areas are derived in certain embodiments. For example, Drug specimen (2) has the two non-overlapping concepts from the partial-area of the same name, containing a total of 23 concepts, in FIGS. 4A-E. They are the area root Drug specimen plus a non-overlapping child not shown in FIG. 12. The entire content of the partial-area Drug specimen is distributed among the d-partial-area Drug specimen and all its descendants. This can be seen by summing up the numbers of concepts in those d-partial-areas: 2+1+13+2+4+1=23. The same holds true for the other top-level d-partial-areas and their respective descendants in the figure.

Figure 14:
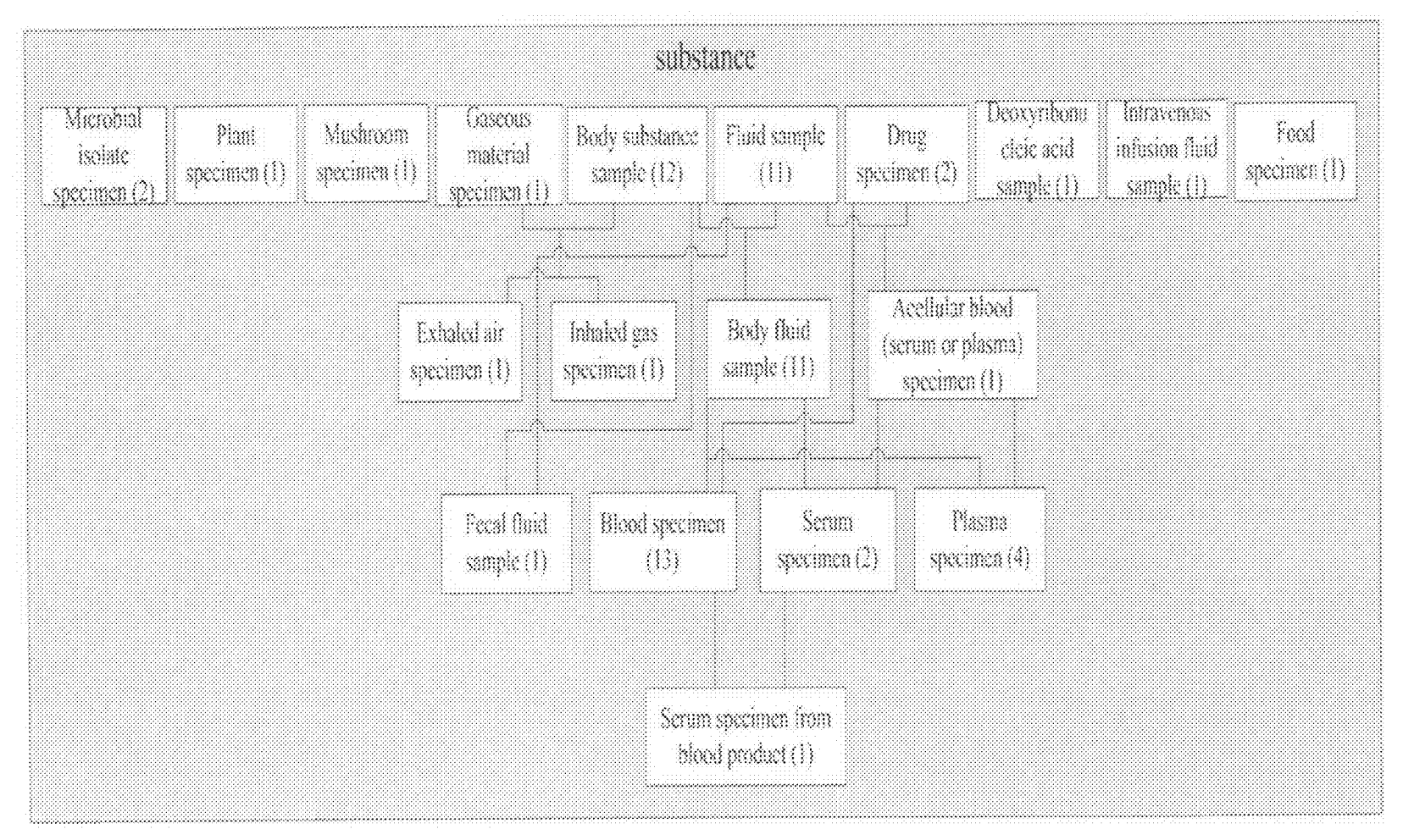

The complete node for {substance} as illustrated in one embodiment of the present invention is shown in FIG. 14, which differs from FIG. 13 only in the inclusion of the six additional d-partial-areas derived from the corresponding six partial-areas (FIGS. 4A-E) that do not contain any overlapping concepts.

The isolation of these d-partial-areas from the others conveys the absence of overlaps for said embodiment. Overall, this network can be used, for example, as a vehicle for comprehending the details of the kinds of overlapping concepts and their numbers in an underlying hierarchy such as found in SNOMED.

Figure 15:
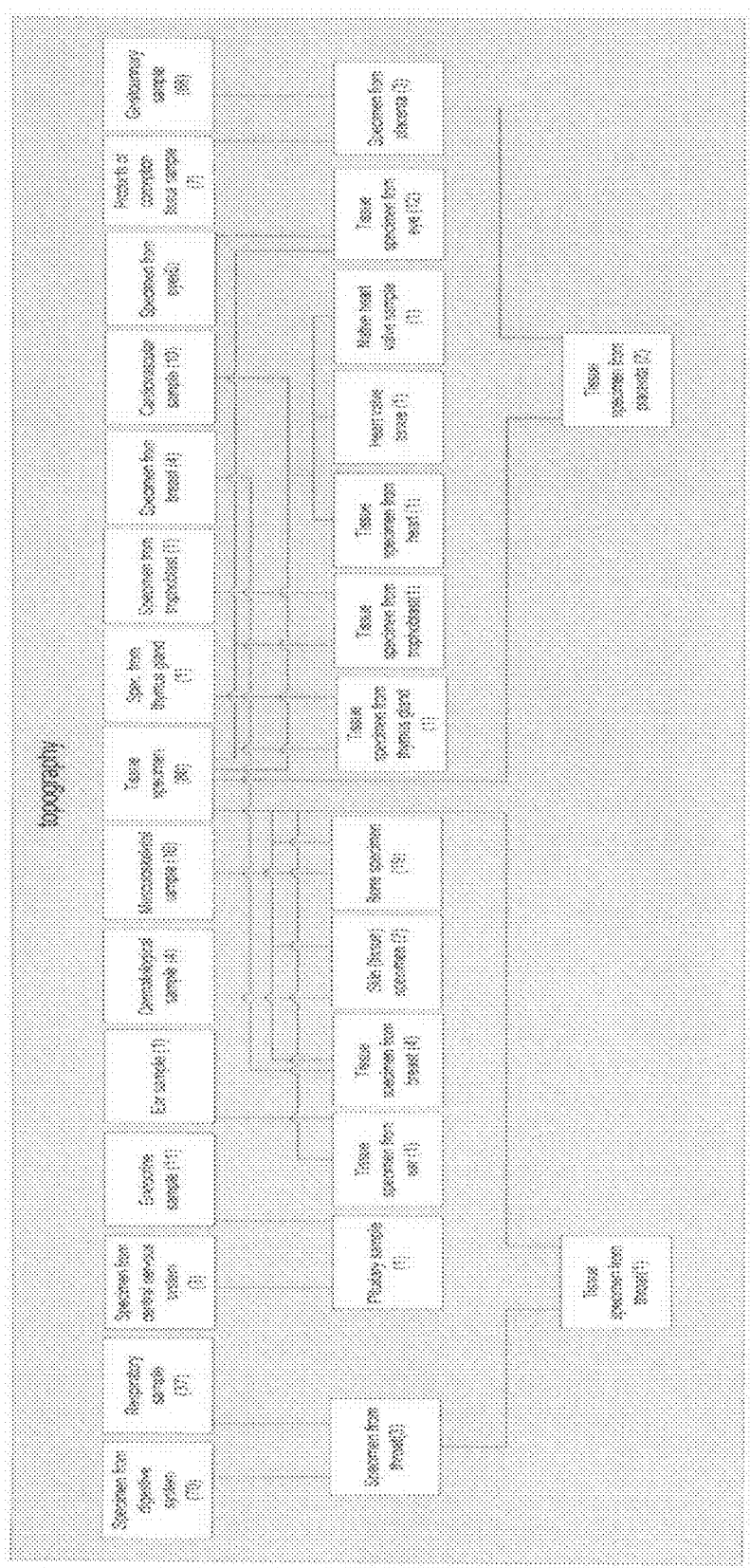
FIG. 15 is a block diagram of d-partial-area taxonomy for the area {topography} according to one or more aspects of the present invention.

FIG. 15 provides a larger excerpt of the portion of the d-partial-area taxonomy appearing within the area {topography}, highlighting the extensive overlapping among its partial-areas. As shown in Table 1, this area has 116 overlapping concepts distributed among 52 d-partial-areas. Most of the overlapping concepts have Tissue specimen as one of their partial-areas, as listed in Table 2. In the top level of FIG. 15, we see the 15 d-partial-areas obtained by removing all overlapping concepts from the original partial-areas. On the next level down, we find 13 d-partial-areas having base overlapping roots. Two d-partial-areas with derived overlapping roots appear on the bottom level. Many other d-partial-areas with few concepts have been omitted. Again, it should be noted that the intersection of two partial-areas may contain several overlapping roots. For example, the intersection of Tissue specimen and Cardiovascular sample has three overlapping roots, as shown in the figure: Tissue specimen from heart, Heart valve tissue, and Native heart valve sample.

The value of a terminological knowledge-base depends on the accuracy and reliability of its constituent knowledge. This is true from the perspective of both ad hoc users and developers of software systems, such as EHR software and decision-support systems, that are dependent on that knowledge. Moreover, the ability to visualize and assess the knowledge's underlying structural organization is a critical factor contributing to terminology usability, deployment, and maintenance. The area and partial-area taxonomy abstraction networks have been shown to support maintenance efforts for SNOMED and the NCIt (H. Min, et al., Auditing as part of the terminology design life cycle, JAMIA 13 (6) (2006) 676-690). The d-partial-area taxonomy of certain embodiments of the present invention extends the area taxonomy paradigm to more properly present the overlapping concepts by highlighting semantically uniform groups and their sizes. For example, FIG. 13 highlights the groups Blood specimen (13), Serum specimen (2), and Plasma specimen (4), which were originally hidden but tacitly accounted for multiple times in Body substance sample (47), Fluid sample (44), and Drug specimen (23) in FIGS. 4A-E.

In FIG. 15, showing the area {topography}, we find only two d-partial-areas with derived overlapping roots. We find more than twice that number, with many concepts in their d-partial-areas, in the excerpt of {substance} in FIG. 13. What we see in {topography} is extensive overlapping with many base overlapping roots but not as complex a pattern as is found in {substance}. An interesting finding revealed by FIG. 15 is that Products of conception tissue sample, the second d-partial-area from the right in the first level, represents a modeling error. Its root should not actually have been a root but rather an overlapping concept of Tissue specimen and Genitourinary sample.

In certain embodiments of the present invention, we find what we call overlapping roots, which represent the convergence of multiple hierarchical paths originating at the roots of an area. A variety we call "base overlapping root" is less complex than the "derived overlapping root." Within the latter, we have identified different kinds according to Cases (2) and (3) of the definition. The organizational subtleties of the various kinds of overlapping concepts are abstracted in certain embodiments of the present invention. The present invention breaks down the highly tangled group of overlapping concepts of an area into subsets in a manner that summarizes their hierarchical configuration and supports orientation into their nature. This phenomenon is demonstrated in one embodiment of the present invention, for example, in FIG. 14, where nine d-partial-areas (rooted at derived overlapping roots) on the second and third levels expose the very complex modeling of the 35 overlapping concepts in a clear and unambiguous way, while all this knowledge is hidden "under the hood" in the partial-area taxonomy of FIGS. 4A-E. The refined view helps in assessing the correctness of the modeling of this highly complex portion of the SNOMED hierarchy.

Due to the typically limited availability of resources for auditing, it is important to provide methods for focusing auditing efforts on concepts or groups of concepts where those efforts are most likely to be needed. As noted above we have proposed and implemented SNOMED auditing regimens that make use of the programmatically derived area and partial-area taxonomies. We have shown that the taxonomies promote more efficient and effective auditing. In particular, different kinds of concept errors have been found to manifest themselves as anomalies at the taxonomy level, allowing for efficient discovery.

The enhanced display provided by the d-partial-area taxonomy of certain embodiments of the present invention can be utilized by an editor who needs to, say, add concepts to the underlying hierarchy or perform some changes. The view afforded into the collection of overlapping concepts enables the formulation of an auditing strategy for the review of those concepts. For example, the partition of overlapping concepts of an area into disjoint sets exhibiting semantic uniformity permits a regimen of "group-based auditing," a theme which we have successfully employed in other related contexts. See, M. Halper, et al., Analysis of error concentrations in SNOMED, in: J. M. Teich, J. Suermondt, G. Hripcsak (Eds.), Proc. 2007 AMIA Annual Symposium, Chicago, Ill., 2007, pp. 314-318; Y. Chen, et al., Structural group auditing of a UMLS semantic type's extent, Journal of Biomedical Informatics 42 (1) (2009) 41-52; Y. Chen, et al., Structural group-based auditing of missing hierarchical relationships in UMLS, Journal of Biomedical Informatics 42 (3) (2009) 452-467; Y. Chen et al, Expanding the extent of a UMLS semantic type via group neighborhood auditing, JAMIA 16 (5) (2009) 746-757. The complexity and inter-relationships of these disjoint groups oftentimes suggest certain orderings for the review of the concepts that can end up facilitating the overall auditing process and potentially simplifying and accelerating the work of the domain-expert auditor.

While the present disclosure has been discussed herein in the context of SNOMED, its applicability extends to other hierarchies and DL-based terminologies such as the NCIt. Moreover, it is expected that terminologies such as Kaiser-Permanente's CMT (R. H. Dolin, et al., Kaiser Permanente's Convergent Medical Terminology, in: M. Fieschi, E. Coiera, Y.-C. Li (Eds.), Proc. Medinfo 2004, San Francisco, Calif., 2004, pp. 346-350) and the VA's ERT (M. J. Lincoln, et al., U.S. Department of Veterans Affairs Enterprise Reference Terminology strategic overview, in: M. Fieschi, et al. (Eds.), Proc. Medinfo 2004, San Francisco, Calif., 2004, pp. 391-395), that have been derived in part from SNOMED, may prove to be fertile grounds for additional applications. By 2015, SNOMED is slated to become a standard for problem-list encoding in EHRs under the HITECH initiative. It is thus reasonable to assume that further derivatives from SNOMED will emerge. SNOMED's design, in fact, anticipates the need for extensions and subsets in order to craft terminological artifacts that are tuned to the needs of individual hospitals and other organizations. Its "reference set specification" serves the purpose of extracting components of SNOMED tailored to particular organizational preferences and use-cases.

In reviewing abstraction networks of terminologies, one can distinguish between extrinsic and intrinsic networks. In the former, the nodes of the network represent categories obtained from knowledge outside the terminology itself. The Semantic Network of the UMLS is such an example. The nodes of the Semantic Network, called semantic types, represent known, broad categories in the biomedical field. A modified abstraction network for the UMLS is the Refined Semantic Network (RSN). See, J. Geller, et al, Semantic refinement and error correction in large terminological knowledge bases, Data & Knowledge Engineering 45 (1) (2003) 1-32. A defining feature of the RSN is the fact that the extents of its types (i.e., the sets of concepts assigned respective types) are semantically uniform and disjoint, offering a clearer abstraction view.

In an intrinsic abstraction network, the categories are derived directly from the specific concepts of the terminology. An example of such a network is the partial-area taxonomy, which has been described above. In addition to its derivation from SNOMED hierarchies, it has been used in the context of the NCIt. Another example of an intrinsic network is the object-oriented schema that has been derived from the MED. As with the taxonomies, concepts that exhibit more relationships than their parents serve as roots of and to name the classes in the schema. In terms of size, the schema is relatively small in its number of nodes compared to the partial-area taxonomy.

Complex concepts, can be characterized in a variety of ways. Both extrinsic and intrinsic networks have been utilized for this purpose. For example, in the context of the partial-area taxonomy of SNOMED, we have seen that strict-inheritance regions, groupings based on more "tangled" inheritance patterns and thus naturally containing more complex concepts, tended to experience larger percentages of errors. With respect to the UMLS, we saw that concepts of higher complexity were those assigned multiple semantic types. When small groups of concepts sharing the same multiple typing were examined, they were found to have a higher likelihood of error, due mostly likely to the uncommon semantics that they elaborated. Concepts appearing in the extents of intersection classes, multiply inheriting classes within the MED schema, also were inherently more complex and showed increased error rates.

In general, an abstraction network should represent a significant reduction in size (i.e., number of nodes) vis-à-vis its underlying concept network. For the Specimen hierarchy, the area taxonomy provides a 0.023 reduction factor (24 areas versus 1,056 concepts). The partial-area taxonomy has a reduction factor of 0.34 (361 partial-areas versus 1,056 concepts). The d-partial-area taxonomy of certain embodiments of the present invention only has a reduction factor of 0.41 (433 d-partial-areas versus 1,056 concepts). Note that the higher reduction factor for the d-partial-area taxonomy of said embodiments is the justifiable price paid for the enhanced view obtained by the inclusion of the d-partial-areas that abstract the more complex overlapping concepts. There is no impact on the representation of those partial-areas experiencing no overlap in the partial-area taxonomy. It should be noted that the relatively high reduction factor for the partial-area taxonomy is a result of a large number of partial-areas containing just one concept each (so-called "singletons"). As discussed above, such partial-areas tend to signal errors.

The reduction factors aside, the three taxonomies complement each other in terms of granularity of display, with a zooming effect achieved as one moves successively through them starting from the area taxonomy. When used together in this manner, they provide a multi-scale display. The area taxonomy offers a global view of the hierarchy's layout and the partial-area taxonomy provides a more semantically focused view of the areas, whereas the real benefits of the d-partial-area taxonomy are seen at the local level—on the scale of an individual area—where it helps to reveal the complexity of the configuration of the overlapping concepts.

The practical uses of the present invention are manifold. In some aspects the disclosed subject matter enables an excellent small summary of what is essential in the domain of an ontology; such a summary is essential for the maintenance of an ontology. Moreover, a person trying to communicate with another person about the domain could refer to the common display of an abstraction network, just as two people who are trying to meet at a general location, such as Central Park, could use a common map of Central Park to agree on a meeting point. In another example, a team of programmers writing a program about data in a domain could refer to the common display of an abstraction network as the basis for understanding "what is going on in this domain" and as the basis for a program design. Orientation obtainable by displays achievable using the presently disclosed subject matter may be used in the design of techniques for quality assurance of ontologies.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

All references cited are incorporated herein by reference in their entirety.

References

[1] IHTSDO: SNOMED CT, available at http://www.ihtsdo.org/snomed-ct. Accessed Mar. 30, 2011.
[2] Y. Wang, M. Halper, H. Min, Y. Perl, Y. Chen, K. A. Spackman, Structural methodologies for auditing SNOMED, Journal of Biomedical Informatics 40 (5) (2007) 561-581.
[3] M. Halper, Y. Wang, H. Min, Y. Chen, G. Hripcsak, Y. Perl, K. A. Spackman, Analysis of error concentrations in SNOMED, in: J. M. Teich, J. Suermondt, G. Hripcsak (Eds.), Proc. 2007 AMIA Annual Symposium, Chicago, Ill., 2007, pp. 314-318.
[4] Y. Wang, M. Halper, D. Wei, H. Gu, Y. Perl, J. Xu, G. Elhanan, Y. Chen, K. A. Spackman, J. T. Case, G. Hripcsak, Auditing complex concepts of SNOMED using a refined hierarchical abstraction network; Submitted in parallel for publication in JBI as a companion paper.
[5] Y. Wang, D. Wei, J. Xu, G. Elhanan, Y. Perl, M. Halper, Y. Chen, K. A. Spackman, G. Hripcsak, Auditing complex concepts in overlapping subsets of SNOMED, in: J. Suermondt, R. S. Evans, L. Ohno-Machado (Eds.), Proc. 2008 AMIA Annual Symposium, Washington, D.C., 2008, pp. 273-277.
[6] IHTSDO, SNOMED CT Abstract Logical Models and Representational Forms (draft document) (January 2008).
[7] D. Wei, M. Halper, G. Elhanan, Y. Chen, Y. Perl, J. Geller, K. A. Spackman, Auditing SNOMED relationships using a converse abstraction network, in: Proc. 2009 AMIA Annual Symposium, San Francisco, Calif., 2009, pp. 685-689.
[8] D. Wei, Y. Wang, Y. Perl, J. Xu, M. Halper, K. A. Spackman, Complexity measures to track the evolution of a SNOMED hierarchy, in: J. Suermondt, R. S. Evans, L. Ohno-Machado (Eds.), Proc. 2008 AMIA Annual Symposium, Washington, D.C., 2008, pp. 778-782.
[9] H. Min, Y. Perl, Y. Chen, M. Halper, J. Geller, Y. Wang, Auditing as part of the terminology design life cycle, JAMIA 13 (6) (2006) 676-690.
[10] Y. Chen, H. Gu, Y. Perl, J. Geller, M. Halper, Structural group auditing of a UMLS semantic type's extent, Journal of Biomedical Informatics 42 (1) (2009) 41-52.
[11] Y. Chen, H. Gu, Y. Perl, J. Geller, Structural group-based auditing of missing hierarchical relationships in UMLS, Journal of Biomedical Informatics 42 (3) (2009) 452-467.
[12] J. Geller, C. P. Morrey, J. Xu, M. Halper, G. Elhanan, Y. Perl, G. Hripcsak, Comparing inconsistent relationship configurations indicating UMLS errors, in: Proc. 2009 AMIA Annual Symposium, San Francisco, Calif., 2009, pp. 193-197.
[13] J. J. Cimino, H. Min, Y. Perl, Consistency across the hierarchies of the UMLS Semantic Network and Metathesaurus, Journal of Biomedical Informatics 36 (6) (2003) 450-461.
[14] J. Geller, H. Gu, Y. Perl, M. Halper, Semantic refinement and error correction in large terminological knowledge bases, Data & Knowledge Engineering 45 (1) (2003) 1-32.
[15] H. Gu, Y. Perl, G. Elhanan, H. Min, L. Zhang, Y. Peng, Auditing concept categorizations in the UMLS, Artificial Intelligence in Medicine 31 (1) (2004) 29-44.
[16] H. Gu, G. Hripcsak, Y. Chen, C. P. Money, G. Elhanan, J. J. Cimino, J. Geller, Y. Perl, Evaluation of a UMLS auditing process of semantic type assignments, in: J. M. Teich, J. Suermondt, G. Hripcsak (Eds.), Proc. 2007 AMIA Annual Symposium, Chicago, Ill., 2007, pp. 294-298.
[17] Y. Chen, H. Gu, Y. Perl, M. Halper, J. Xu, Expanding the extent of a UMLS semantic type via group neighborhood auditing, JAMIA 16 (5) (2009) 746-757.
[18] R. H. Dolin, J. E. Mattison, S. Cohn, et al., Kaiser Permanente's Convergent Medical Terminology, in: M. Fieschi, E. Coiera, Y.-C. Li (Eds.), Proc. Medinfo 2004, San Francisco, Calif., 2004, pp. 346-350.
[19] M. J. Lincoln, S. H. Brown, V. Nguyen, T. Cromwell, et al., U.S. Department of Veterans Affairs Enterprise Reference Terminology strategic overview, in: M. Fieschi, et al. (Eds.), Proc. Medinfo 2004, San Francisco, Calif., 2004, pp. 391-395.
[20] Department of Health and Human Services, Health Information Technology: Initial Set of Standards, Implementation Specifications, and Certification Criteria for Electronic Health Record Technology; Final Rule, 45 CFR Part 170, July 28.

What is claimed is:

1. A method of providing disjoint partial-area taxonomy, comprising:

deriving an area taxonomy from a given hierarchy, comprising identifying sets of concepts in the hierarchy that have identical relationships, replacing each set of the concepts with a single area, representing every area as a node connected to other nodes by links representing child-of hierarchical relationships, reflecting hierarchical (IS-A) relationships by identifying root concepts of an area, and connecting areas so that all IS-A relationships from the root concept of the area to a concept in another area results in a child-of hierarchical link to the second area;

dividing all concepts in each area such that all descendant concepts of a single root form a partial-area;

representing each partial-area as a smaller item within each representation of an area; and partitioning and generating a diagram separating the partial-areas into base partial-areas without overlaps and disjoint partial-areas containing overlapping concepts.

2. The method according to claim 1 wherein the single root provides a uniform semantics for the partial-area.

3. The method according to claim 1 wherein the representation of a partial-area is a shape within a larger shape.

4. The method according to claim 1 comprising displaying the diagram on a user interface.

5. The method according to claim 4 wherein the diagram is dimensioned to fit on a single computer screen.

6. An apparatus, including a processor operating to perform actions in response to executing computer program instructions, the actions comprising:

deriving an area taxonomy from a given hierarchy, comprising identifying sets of concepts in the hierarchy that have identical relationships, replacing each set of the concepts with a single area, representing every area as a node connected to other nodes by links representing child-of hierarchical relationships, reflecting hierarchical (IS-A) relationships by identifying root concepts, and connecting areas so that all IS-A relationships from the root concept of the area to a concept in another area results in a child-of hierarchical link to the second area;

dividing all concepts in each area such that all descendant concepts of a single root form a partial-area;

representing each partial-area as a smaller item within each representation of an area; and partitioning and generating a diagram separating the partial-areas into base partial-areas without overlaps and disjoint partial-areas containing overlapping concepts.

7. The apparatus according to claim 6 wherein the single root provides a uniform semantics for the partial-area.

8. The apparatus according to claim 6 wherein the representation of a partial-area is a shape within a larger shape.

9. The apparatus according to claim 6 wherein the actions further comprise displaying the diagram on a user interface.

10. The apparatus according to claim 9 wherein the diagram is dimensioned to fit on a single computer screen.

11. A non-transitory, computer readable storage medium containing a computer program, which when executed by a computer processor causes the computer processor to perform actions, the actions comprising:

deriving an area taxonomy from a given hierarchy, comprising identifying sets of concepts in the hierarchy that have identical relationships, replacing each set of the concepts with a single area, representing every area as a node connected to other nodes by links representing child-of hierarchical relationships, reflecting concepts by hierarchical (IS-A) relationships by identifying root concepts, and connecting areas so that all IS-A relationships from the root concept of the area to a concept in another area results in a child-of hierarchical link to the second area;

dividing all concepts in each area, such that all descendant concepts of a single root form a partial-area;

representing each partial-area as a smaller item within each representation of an area;

partitioning and generating a diagram separating the partial-areas into base partial-areas without overlaps and disjoint partial-areas containing overlapping sets.

12. The non-transitory, computer readable storage medium according to claim 11 wherein the single root provides a uniform semantics for the partial-area.

13. The non-transitory, computer readable storage medium according to claim 11 wherein the representation of a partial-area is a shape within a larger shape.

14. The non-transitory, computer readable storage medium according to claim 11 wherein the wherein the actions further comprise displaying the diagram on a user interface.

15. The non-transitory, computer readable storage medium according to claim 14 wherein the diagram is dimensioned to fit on a single computer screen.

* * * * *